United States Patent
Schmitz-Galow et al.

(10) Patent No.: US 12,362,690 B2
(45) Date of Patent: Jul. 15, 2025

(54) LOGISTICS SPACE AND METHOD FOR OPERATING SAME

(71) Applicant: FL Technology GmbH, Griesheim (DE)

(72) Inventors: Stefan Schmitz-Galow, Griesheim (DE); Oliver Matipa, Griesheim (DE); Andreas Schweigert, Griesheim (DE); Ali Montazeri Najafabadi, Griesheim (DE)

(73) Assignee: FL Technology GmbH, Griesheim (DE)

( * ) Notice: Subject to any disclaimer, the term of this patent is extended or adjusted under 35 U.S.C. 154(b) by 97 days.

(21) Appl. No.: 18/259,890

(22) PCT Filed: Dec. 30, 2021

(86) PCT No.: PCT/EP2021/087879
§ 371 (c)(1),
(2) Date: Jun. 29, 2023

(87) PCT Pub. No.: WO2022/144431
PCT Pub. Date: Jul. 7, 2022

(65) Prior Publication Data
US 2024/0120859 A1    Apr. 11, 2024

(30) Foreign Application Priority Data
Dec. 30, 2020    (DE) ............ 10 2020 135 153.4

(51) Int. Cl.
*H02K 11/21*    (2016.01)
*B65G 54/02*    (2006.01)
(Continued)

(52) U.S. Cl.
CPC .............. *H02P 6/006* (2013.01); *H02K 11/21* (2016.01); *H02K 41/02* (2013.01); *H02P 6/20* (2013.01);
(Continued)

(58) Field of Classification Search
CPC .... H02P 6/006; H02P 6/20; H02P 6/24; H02P 6/28; H02P 7/02; H02P 25/06;
(Continued)

(56) References Cited

U.S. PATENT DOCUMENTS 6,226,073 B1 *  5/2001  Emoto ................. H02K 3/24
                                                  378/34
6,327,026 B1 * 12/2001  Wakui ................. G03F 7/707
                                                  355/75
(Continued)

FOREIGN PATENT DOCUMENTS

| CA | 3084178 A1 | 12/2020 |
|---|---|---|
| DE | 10 2017 131 320 A1 | 12/2017 |
| DE | 20 2019 000 816 U1 | 5/2020 |

OTHER PUBLICATIONS

Patent Cooperation Treaty, PCT/EP2021/087879, International Search Report, Jul. 21, 2022.

*Primary Examiner* — David Luo
(74) *Attorney, Agent, or Firm* — Jones Day

(57) ABSTRACT

The present invention relates to a logistics area (15, 115, 215, 315, 415) comprising a plurality of planar units (1, 101, 201, 301, 401), wherein each planar unit (1, 101, 201, 301, 401) is equipped with at least one encoder (5) having at least one sensor array (11) for determining the position and/or positioning of at least one mover (40), wherein the at least one mover (40) comprises magnets arranged in at least one pole pitch grid, wherein further the plurality of planar units (1, 101, 201, 301, 401) being arranged to a surface in such a way that the encoders (5) of the planar units (1, 101, 201, (Continued)

301, 401) form at least an at least area-wise uniform grid, wherein the distance of the encoders (5) of at least two planar units (1, 101, 201, 301, 401) and/or at least two encoders (5) of a planar unit (1, 101, 201, 301, 401) corresponds to a multiple of the pole pair width of the magnets of the at least one mover (40), as well as a method for operating at least one logistics surface and a computer program product as well as a control unit for a logistics surface.

64 Claims, 5 Drawing Sheets

(51) Int. Cl.
| | |
|---|---|
| *H02K 41/02* | (2006.01) |
| *H02P 6/00* | (2016.01) |
| *H02P 6/20* | (2016.01) |
| *H02P 6/24* | (2006.01) |
| *H02P 6/28* | (2016.01) |
| *H02P 7/02* | (2016.01) |
| *H02P 25/06* | (2016.01) |

(52) U.S. Cl.
CPC .................. *H02P 6/24* (2013.01); *H02P 6/28* (2016.02); *H02P 7/02* (2016.02); *H02P 25/06* (2013.01); *B65G 54/02* (2013.01); *H02K 2201/18* (2013.01); *H02K 2213/03* (2013.01)

(58) Field of Classification Search
CPC .... H02K 11/21; H02K 41/02; H02K 2201/18; H02K 2213/03; H02K 2213/12; H02K 11/215; H02K 11/33; H02K 41/031; B65G 54/02
USPC .................. 318/400.4, 400.37, 400.01, 700
See application file for complete search history.

(56) References Cited

U.S. PATENT DOCUMENTS

| | | | |
|---|---|---|---|
| 11,437,893 | B2 | 9/2022 | Brinkmann et al. |
| 2014/0204358 | A1 | 7/2014 | Yang et al. |
| 2016/0161288 | A1 | 6/2016 | Lu |
| 2018/0205304 | A1 | 7/2018 | Lu |
| 2020/0303997 | A1 | 9/2020 | Brinkmann et al. |
| 2020/0304008 | A1 | 9/2020 | Brinkmann et al. |

* cited by examiner

LOGISTICS SPACE AND METHOD FOR OPERATING SAME

The present invention relates to a logistics surface comprising a plurality of planar units, wherein each planar unit is equipped with at least one encoder having at least one sensor array for determining the position and/or positioning of at least one mover, wherein the at least one mover comprises magnets arranged in at least one pole pitch grid, and a method for operating a logistics surface.

In known logistics systems, which include at least one controlling and/or regulating logistics area, the current state of the art does not or only insufficiently allow for flexible and unlimited expansion by a control system working in real time.

In such known systems, a central control unit of the logistics system located externally to the logistics area controls all travel commands for the individual movers based on a travel order. For example, the travel order includes the instruction to transport or move a good or a mover from a first point of the logistics area to a second point. Based on this travel order, the travel path is then initially subdivided into individual sections, in particular as a function of obstacles located on the logistics area, such as further movers or stationary obstacles. Based on this information, the trajectories for the individual sections are then calculated in the central control unit, taking into account the boundary conditions of direction, acceleration rate, maximum speed and deceleration rate. The resulting target values for the executing field-generating units in the area must be sent cyclically to these units in real time. The communication system between the central control unit and the executing units is quickly brought to its capacity limit by the resulting large amounts of data, the long signal paths and the large number of participants. The commonly used communication paths (WLAN; Bluetooth; NFC; ZigBee; Wibree; Ethernet-based bus systems, etc.) lose real-time capability with high numbers of participants in large areas. This leads to overloads of the communication network and data loss. Another disadvantage is that a central control unit with a large computing capacity is required, and this control unit must be reprogrammed, if not replaced, or at least expanded when the logistics area is expanded. Current fluid logistics systems are therefore subject to major limitations in terms of payload capacity, energy consumption, investment costs and expandability.

It is therefore the task of the present invention to overcome the aforementioned disadvantages, in particular to provide a logistics area as well as a method for operating a logistics area, which make it possible to expand a control system flexibly and almost indefinitely without the need to adapt, replace or expand a central control unit and in particular without overloading the communication paths used.

The task relating to the logistics surface is solved according to the invention in that the plurality of planar units is arranged to form a surface in such a way that the encoders of the planar units form at least one grid which is uniform at least in some areas, the spacing of the encoders of at least two planar units and/or at least two encoders of a planar unit corresponding to a multiple of the pole pair width of the magnets of the at least one mover.

Pole pitch grid in the sense of the invention is understood to mean an arrangement of a plurality of magnets whose poles are arranged at a regular, repeating distance, in particular pole pair spacing, from one another, in particular alternately. In this case, the arrangement is preferably uniform in at least two spatial directions extending orthogonally to one another, in particular a uniform grid is formed in the spatial directions, for example similar to a checkerboard pattern.

In one embodiment, an area encompassed by the at least one mover is greater than an area encompassed by a planar unit, preferably encompassing the area of at least four planar units, the mover rests movably on the logistics surface and/or is held in position by its weight and/or by the magnetic attraction of at least some of the magnets in the pole pitch grid of the at least one mover, in particular insofar as the at least one mover is not to be actively moved, and/or the multiple of the pole pair width is a natural number, a real number greater than 1 and/or a rational number.

In a further embodiment, at least one length of the planar unit defining the, preferably square, area of the planar unit corresponds to a, in particular natural, real and/or rational multiple, preferably 24 times or 12 times, the pole pair width of the magnets of the at least one mover and/or the planar unit has a length of more than 100 mm, preferably more than 200, more preferably more than 400, particularly preferably 480 mm, and/or the magnets in the pole pitch grid of the at least one mover are arranged in a pole pair width of more than 4 mm, preferably more than 16.66 mm, more preferably more than 18.75 mm, particularly preferably 20 mm or 40 mm.

In addition, in a further embodiment, the sensors of the sensor array are arranged at a distance of 1/n of the pole pair width of the magnets, wherein the array comprises in particular $n^2$ sensors, wherein preferably an array with nine sensors arranged at a distance of ⅓ of the pole pair width is applicable, wherein in particular the sensors comprise Hall sensors, Förster probes and/or magnetometers, and/or wherein n is a natural number, a real number greater than 1 and/or a rational number.

In a further embodiment, the at least one encoder is arranged centrally in the planar unit, preferably centrally on the surface of the planar unit facing the at least one mover.

In one embodiment, the planar unit can comprise at least one control unit that is preferably operatively connected to the at least one encoder of the planar unit, in particular via at least one first communication interface, and/or is set up to read and/or evaluate signals, preferably at least one signal amplitude, of the at least one encoder or of the sensor array of the at least one encoder, preferably in order to detect whether the planar unit is at least partially covered by a mover, with the communication with the at least one encoder in particular taking place by means of SPI (Serial Peripheral Interface) communication.

In this context, the terms "encoder signals" and "signals of the encoders" are used synonymously in this application, in particular for the signals that are acquired by means of an encoder and/or an array. Furthermore, such encoder signals or signals of the encoders may comprise, in particular, raw and/or pre-processed and/or evaluated signals or data acquired by means of the encoders.

In a further embodiment, the planar unit can comprise at least one, preferably two and/or a plurality of, drive unit(s), which is/are designed in particular to impart the movement of a subregion of the mover or movers covering the planar unit via the planar unit, wherein preferably the directions of movement imparted by the drive units are orthogonal to one another and/or the drive unit(s) is/are an electromagnetic drive unit.

Furthermore, in this embodiment, the at least one drive unit may be in communication with the at least one control unit via at least one second communication interface, preferably to be controllable by the at least one control unit and/or to be supplied with power by the control unit.

Furthermore, additionally or alternatively in one embodiment, the at least one control unit and the at least one drive unit of the planar unit may be designed as one component, preferably as an integrated component, in particular as a 2-axis servo or stepper motor control system.

In one embodiment, the at least one control unit of at least one planar unit can communicate, in particular in real time, with one or more other control units of other planar units of the logistics area via at least one third communication interface, preferably a proprietary bus, particularly preferably an FPGA-based bus, CAN bus, EtherCAT or another Ethernet-based bus, and/or, preferably via at least one fourth communication interface, with at least one bottom layer motion controller, BLMC, control unit, in particular be connected, wherein preferably a contiguous area of planar units of the logistics area is assigned to each BLMC, in particular the assigned planar units are each in operative connection with the respective BLMC via the fourth communication interface, in particular are connected, and/or the BLMCs and control units are organized in cascade and/or are connected, at least indirectly.

Furthermore, the at least one control unit of at least one planar unit can additionally be in active connection, in particular connected and/or communicate, with the control units of the respective surrounding, in particular adjacent and/or surrounding, planar units, preferably directly, via the third communication interface.

Furthermore, the at least one control unit of at least one planar unit can be in operative connection with at least one control unit of at least one of the respective surrounding, and/or adjacent surrounding, planar units, preferably directly, via the third communication interface, in particular is connected and/or communicates.

Furthermore, the communication and/or connection of the at least one control unit of the at least one planar unit with the neighboring and/or surrounding control unit(s) of the planar unit(s) may be limited, in particular by at least one external command of the at least one BLMC and/or the at least one control system and/or a higher-level grouping of planar units and/or a subdivision of the logistics area, wherein preferably planar units that are in a neighboring relationship only via at least one respective edge communicate via the third communication interface.

In addition or alternatively, the at least one BLMC can be operatively connected to at least one higher-level control system, preferably via at least one fifth communication interface, preferably by means of the control system, the BLMC and/or the control unit, one or more partial routes, travel orders and/or travel commands for the at least one or more movers can be generated and/or transmitted to the BLMC(s) concerned, preferably the travel order(s) being provided to the higher-level control system by an enterprise resource planning system (ERPS). the travel order(s) can be made available to the higher-level control system by an enterprise resource planning system (ERPS).

In addition, the higher-level control system can be set up for at least one and/or each mover to which a travel command and/or travel order is assigned to define the control unit of a planar unit, which and/or whose at least one encoder is covered at least in some areas by the mover, as the primary control unit or master. the control unit of a planar unit, which and/or whose at least one encoder is covered at least in some areas by the mover, as the primary control unit or master, the control unit defined as the primary control unit preferably organizing the partial routes and/or travel commands necessary for executing the travel order, in particular the information relevant for the travel command and/or the partial route, and/or forwarding the travel commands and/or partial routes necessary for executing the travel order and/or the information necessary for the travel command and/or the partial route to at least one control unit of at least one further planar unit, preferably via the third and/or fourth communication interface.

In one embodiment, it is proposed that at least a part of the control units of at least a part of the respective adjacent and/or surrounding planar units transmit at least (i) a part of the signals of the encoders, the raw encoder signals, the preprocessed encoder signals, in particular the time derivative of encoder signals, and/or data associated with the encoder signals, in particular a measure of signal stability or the like, preferably a signal-to-noise ratio, to the at least one control unit of the at least one planar unit, preferably transmitting the encoder signals from adjacent and/or surrounding planar units having a common edge with the at least one planar unit, (ii) additional information relevant for the position and/or positioning and/or position and/or positioning change of a mover above the at least one planar unit, in particular during the execution of a move command in which the one planar unit is involved, (iii) the at least one control unit of the at least one planar unit is adapted to combine the transmitted encoder signals and the additional information in order to judge an assignment of the received encoder signals by the at least one control unit according to relevant or not relevant for the position and/or positioning and/or position and/or positioning change of the one mover.

The aforementioned additional information may thereby comprise one or more of the following information: (i) whether the respective adjacent and/or surrounding planar unit is included in the move command for the same mover as the at least one planar unit and/or control unit; (ii) at least a current status regarding an inclusion of the respective adjacent and/or surrounding planar unit $1b$, $1c$ in move commands for other movers, and/or an occupancy by other movers, obstacles and/or other objects on the logistics area, and/or (iii) future reservations for other move commands and/or error messages.

In one embodiment, the control unit defined as the primary control unit is arranged to provide to the at least one control unit of the at least one planar unit, the additional information according to the two preceding paragraphs.

Alternatively or additionally, the at least one control unit of the at least one planar unit can be set up to evaluate the signal of the at least one encoder and/or the encoder signals of the adjacent and/or surrounding planar unit(s) together or separately for positioning and/or position detection or for position and/or position change detection, in particular during a movement of the one mover over the at least one planar unit, wherein the at least one control unit is preferably set up to evaluate, by means of at least one algorithm and/or based on at least one first criterion such as signal stability, signal strength and/or the signal strength and/or signal stability of the encoders of the adjacent and/or surrounding planar units which are or are to be at least partly covered by the mover and/or lie in the direction of movement, in particular the direction of movement of the next movement increment, to select at least one encoder signal from the group of the encoder signals of the neighboring and/or surrounding planar units and/or the encoder signals of the at least one planar unit, wherein preferably this selection is limited to the encoder signals determined to be relevant for the position and/or positioning and/or change in position and/or change in positioning of the one mover and/or this selection takes place in particular in real time, preferably on the respective control unit of the at least one planar unit.

Furthermore, the at least one control unit of the at least one planar unit can be set up to check in at least one first step whether one of the one or more encoder signals detected by the at least one planar unit from the at least one encoder of the planar unit exceeds a first or a second threshold value and/or one or more first threshold values, preferably the one or more first threshold values being defined as signal amplitudes or the like and/or a measure of signal stability, preferably the signal-to-noise ratio or the like; and/or in at least a second step, in particular if none of the at least one encoder signals of the at least one encoder comprised by the planar unit (is valid), resorting to at least one relevant signal of the encoders of the neighboring and/or surrounding planar units, wherein preferably the relevant encoder signal of the neighboring and/or surrounding planar unit having the highest signal quality and/or strength/amplitude is assumed instead of the non-valid signal of the at least one encoder of the planar unit.

Alternatively or additionally, the at least one control unit of the at least one planar unit can be set up to give greater weight to or exclusively take into account at least one of the encoder signals within a trajectory, travel route and/or movement and/or one or more travel steps and/or partial routes that has already been traveled and/or notified.

In addition, the at least one control unit of the at least one planar unit may be arranged to determine at least one effective encoder signal from at least some or all of the adjacent and/or surrounding planar units.

Furthermore, the at least one control unit of the at least one planar unit can be set up to consider the signals of the at least one encoder of the at least one planar unit and/or to let them flow into the determination of the position and/or positioning of the one mover, wherein in combination or alone the effective encoder signal is used for the positioning determination of the one mover above the at least one planar unit.

Alternatively or additionally, in the embodiments of the two previous paragraphs, the at least one control unit of the at least one planar unit can be set up to determine the effective encoder signal either individually or in combination, preferably by averaging and/or an interpolation and/or pattern recognition, from the encoder signals of the neighboring and/or surrounding planar units, in particular those planar units which (i) provide relevant encoder signals; (ii) are and/or were involved in the current travel step of the one mover, whereby in particular planar units which are located in or against the direction of travel of the one mover are weighted more strongly.

Alternatively or additionally, in one embodiment, it can be provided that the at least one control unit of the at least one planar unit is set up to determine the position and/or positioning change of the one mover over a planar unit, in particular by the encoder signals changing over time, preferably by means of an evaluation of at least one derivative and/or a plurality of derivatives, in particular a time derivative, of the encoder signal of the adjacent and/or surrounding planar unit(s) and/or of the at least one planar unit, in which this/these is/are set in a geometric reference to the logistics area and/or of the one mover whose change in position and/or positioning is/are detected. are detected.

Alternatively or additionally, in a further embodiment, it can be provided that the at least one control unit of the at least one planar unit is set up to use the effective encoder signal in order to detect and/or track position and/or positioning change of the one mover, for which purpose preferably (i) at least one temporal change and/or derivative of the effective encoder signal is evaluated and/or (ii) the at least one planned and/or already traveled position and/or positioning change of the travel and/or movement step and/or of the partial route to be executed or already executed is taken into account for better position and/or positioning change detection and/or (iii) the effective encoder signal is integrated into the control unit of the at least one planar unit, which is preferably based on machine learning and/or artificial already executed travel and/or movement step and/or the partial route is taken into account for improved position and/or positioning change detection and/or (iii) the effective encoder signal is incorporated into the position and/or positioning change detection and/or positioning change detection which is preferably supported and/or based on machine learning and/or artificial intelligence.

Furthermore, it may be provided that the at least one control unit of the at least one planar unit and/or the at least one drive unit of the at least one planar unit comprises and/or includes at least one drive controller and/or the at least one control unit comprises at least one motion step planner/trajectory planner, which preferably processes the partial route for the one mover and controls the drive controller accordingly.

In addition, the drive controller can comprise at least two, preferably three, individual controller elements, selected from: at least one position and/or positioning controller, at least one rotational speed/speed controller, and at least one current/current controller, wherein, preferably by means of these controller elements, corresponding control loops can be controlled in each case, in particular for controlling thrust or tractive force, rotational speed or velocity and/or position or positioning, of the drive unit.

Furthermore, the control unit defined as the primary control unit can additionally or alternatively be set up in such a way that further control units of surrounding planar units, which are at least partially covered by the mover, can each be defined as secondary control units or slaves, the secondary control units preferably providing the movement of the mover in feedback and/or together with the primary control unit.

Furthermore, the at least one control unit of the at least one planar unit can be set up for this purpose:
 (i) using the trajectory planner to perform trajectory planning or driving job planning to determine the next driving step and/or movement increment of a partial route;
 (ii) in particular based thereon, to execute the control of the at least one drive unit via the drive controller; and/or
 (iii) using the own encoder signals of a planar unit or the effective encoder signal to track the position and/or positioning change of the mover and/or to control and/or adjust the control loops according to the detected position and/or positioning change, preferably the respective control loops being controlled centrally by the primary control unit or the master, respectively, and/or being controlled individually by the respective control units of the slaves, particularly preferably the position controller being controlled centrally via the primary control unit.

Alternatively or in addition thereto, the control unit defined as the primary control unit can be set up, via the control units of surrounding and/or adjacent planar unit(s) which is/are relevant for the travel order and/or travel command, to interrogate these planar unit(s), in particular with regard to functionality, occupancy by at least one obstacle and/or by at least one other, in particular second, mover, and/or with regard to at least one existing reservation and/or blocking, in particular by another, preferably prioritized, travel order and/or travel command, to reserve and/or include in the provision of the movement of the relevant mover, and/or to release planar units which are no longer required and/or, preferably in feedback with the higher-level BLMCs and/or the higher-level control system or independently, in particular based on the result of the reservation and interrogation of the relevant planar units, to adapt the movement of the mover and/or at least one travel command at least incrementally and/or to interrogate and/or reserve planar units which are required in accordance with the adaptation.

Furthermore, in one embodiment, the control unit defined as the primary control unit can be set up, preferably automatically, during the execution of at least one travel order and/or travel command for a mover, to define a control unit as the subsequent primary control unit, which is preferably at least partially covered by the mover concerned, in particular as soon as (i) the area of the planar unit and/or the at least one encoder of the control unit defined as the primary control unit is no longer covered by the mover and/or (ii) the mover concerned, has covered a predetermined distance at which it is to be expected that the planar unit of the primary control unit is no longer sufficiently covered, this preferably being the case if the relevant mover has covered a distance which corresponds to the extent of a planar unit in the direction of movement of the relevant mover, and/or (iii) the encoder signal of the primary control unit falls below a second threshold value, and/or (iv) no longer has a valid encoder signal.

In this context, the control unit defined as primary can preferably be set up to abandon its function as primary control unit, preferably independently, after the subsequent primary control unit has been defined.

Furthermore, the control unit defined as subsequent primary control unit, may be arranged to define the control unit(s) of the reserved and/or queried planar unit(s) as new secondary control unit(s) resp. planar unit(s), preferably after the area of the reserved planar unit(s) is at least partially covered by the relevant mover, and/or to adopt as secondary control units the planar units defined as secondary control units which are at least partially still covered, and/or the control unit defined as subsequent primary control unit can be arranged to release the control unit defined as primary control unit or to define it as secondary control unit.

Moreover, the second threshold value of the encoder signal may be a signal amplitude or the like and/or a measure of signal stability, preferably the signal-to-noise ratio or the like, and/or may correspond to one of the one or more first threshold values.

Alternatively or additionally, the control unit defined as the primary control unit may be arranged to make the selection of the subsequent primary control unit based on an evaluation of the encoder signals from the planar units involved in the movement, wherein preferably the control unit of a planar unit involved in the movement of the mover that provides the most suitable valid encoder signal is defined as the next primary control unit, wherein preferably the most suitable valid encoder signal among the valid encoder signals is selected taking into account at least one second criterion such as: Signal stability, signal strength and/or the signal strength and/or signal stability of the encoders of the adjacent and/or surrounding planar units which are or are to be at least partially covered by the mover, respectively and/or lie in the direction of movement, in particular the direction of movement of the next movement increment, preferably the first criterion.

In one embodiment, the at least one control unit of a planar unit can be designed to forward the read-out or evaluated signals of the encoder or of the sensor array of the encoder, preferably in real time and/or by means of the fourth communication interface, to the at least one BLMC, the latter preferably forwarding these signals for each connected planar unit, in particular collectively and/or by means of the fifth communication interface, to the higher-level control system and/or forwarding them directly to the higher-level control system.

In a further embodiment, the higher-level control system can be set up to collect the read-out or evaluated signals of the encoder or of the sensor array of the encoder for a plurality of planar units and/or to combine them by means of at least one algorithm into groups, preferably into groups corresponding to a mover.

In addition, the higher-level control system can be set up to use the signals of the encoders and/or the sensor arrays of the encoders of the plurality of planar units, which are combined into groups, to determine the position and/or positioning of the mover, preferably with the aid of further data, in particular the dimensions of the mover or other predefined parameters.

In one embodiment, it can be provided that the higher-level control system is set up to perform a position and/or positioning detection and/or size detection and/or dimension detection of a mover by means of at least one calibration process, preferably at least one encoder signal of the planar units at least partially covered by the mover in question being evaluated by the higher-level control system, in particular the encoder signal being compared against one or more first threshold values.

It may also be provided that the higher-level control system is arranged to detect the dimension and/or the position and/or the positioning of the mover by analyzing the change of at least one encoder signal in dependence on at least one corresponding oscillating forward and/or backward and/or sideward movement of the mover, preferably involving at least one encoder signal of at least one adjacent planar unit that provides a corresponding valid encoder signal only by the movement steps.

Finally, in another embodiment of the logistics area, the higher-level control system may additionally or alternatively be designed to assign individual movers to a network, preferably to define movers of any size and/or logical networks of a plurality of individual and/or new connected movers, and/or to issue and/or manage travel orders for multiple movers and/or connected movers simultaneously, in particular to prioritize the travel orders and forward them to the primary control unit.

The task relating to the method is solved by a method for operating at least one logistics area comprising a plurality of planar units with at least one mover or at least one group of movers which at least partially cover a planar unit, in particular comprising a logistics area according to the invention:

Detecting at least one output signal amplitudes of sensors of at least one sensor array of at least one encoder of the planar unit;

determining at least a first difference of at least two output signal amplitudes; and Checking whether the at least one first difference is within at least one first limit, and/or Detecting at least one magnetic flux or field strength and/or at least one other signal of the sensors of the sensor array of the at least one encoder of the planar unit, which is induced and/or generated by the coverage of a sensor by the mover;

determining at least a second difference between at least one output signal of the at least one sensor of the sensor array resulting from the sensed magnetic flux and/or the other signal on the one hand and a background value on the other hand; and Checking whether the at least one second difference is within at least one second limit.

For the method it is thereby proposed that the first limit value is at most 20%, preferably at most 10%, particularly preferably at most 7% of one of the detected output signal amplitudes and/or the second limit value corresponds to at least 20%, preferably at least 10%, particularly preferably at least 7% of the background value.

Preferably, the method further comprises

Forwarding, preferably in real time, of the detected and/or evaluated signals of the encoder or the sensor array by at least one control unit of the planar unit to at least one BLMC (Bottom Layer Motion Controller), and/or preferably collecting the signals for each planar unit connected to the at least one BLMC;

Forwarding the signals to at least one higher-level control system;

Receiving at least a portion of the signals of the encoders, in particular the raw encoder signals, the pre-processed encoder signals, in particular the time derivative of encoder signals, and/or data associated with the encoder signals, in particular a measure of signal stability or the like, preferably a signal-to-noise ratio, from at least a portion of the respective adjacent and/or surrounding planar units;

receiving additional information relevant to the position and/or positioning and/or position and/or positioning change of a mover or mover assembly above the at least one planar unit, in particular during the execution of a move command involving the one planar unit; and/or combining the at least one part of the received signals of the encoders and the additional information in order to obtain a classification of the received encoder signals by at least one control unit according to relevant or not relevant for the position and/or positioning and/or change of position and/or change of positioning of the one mover . . . .

The method may further comprise the following steps:

evaluating the signal of the at least one encoder and/or one of the encoder signals received from the adjacent and/or surrounding planar unit(s) together or separately for positioning and/or position detection or for position and/or position change detection, in particular during a movement of the one mover over the at least one planar unit by the at least one control unit, wherein preferably the evaluation comprises a selection which is made by means of at least one algorithm and/or based on at least one first criterion such as signal stability, signal strength and/or the signal strength and/or signal stability of the encoders of the adjacent and/or surrounding planar units which are or are to be at least partially covered by the mover, and/or in the direction of movement, and/or in the direction of movement, and/or in the direction of movement, by means of at least one control unit. and/or lie in the direction of movement, in particular the direction of movement of the next movement increment, at least one encoder signal is selected from the group of the encoder signals of the neighboring and/or surrounding planar units and/or the encoder signals of the at least one planar unit, this selection preferably being restricted to the encoder signals determined to be relevant for the position and/or positioning and/or change in position and/or change in positioning of the one mover and/or this selection taking place in particular in real time, preferably on the respective control unit of the at least one planar unit.

Additionally, the method may also include any of the following steps:

checking, in at least a first step, whether one of the one or more encoder signals received by the at least one planar unit from the at least one encoder of the planar unit exceeds a first or a second threshold value and/or one or more first threshold values, preferably the one or more first threshold values being defined as signal amplitudes or the like and/or a measure of signal stability, preferably the signal-to-noise ratio or the like; and/or in at least a second step, in particular if none of the at least one encoder signals of the at least one encoder comprised by the planar unit is valid, falling back on at least one relevant signal of the encoders of the neighboring and/or surrounding planar units, wherein preferably the relevant encoder signal of the neighboring and/or surrounding planar unit, which has the greatest signal quality and/or strength/amplitude, is assumed instead of the non-valid signal of the at least one encoder of the planar unit.

Alternatively or additionally, the method may comprise:

Stronger weighting or exclusive consideration of at least one of the encoder signals within an already driven and/or advised trajectory, driving route and/or movement and/or one or more driving steps and/or partial routes by the at least one control unit of the at least one planar unit.

Preferred embodiments of the method provide that the method further comprises.

Determining at least one effective encoder signal from at least some or all of the adjacent and/or surrounding planar units by the at least one control unit of the at least one planar unit.

It is also suggested that the process include:

taking into account and/or determining the position and/or positioning of the one mover of the or by the signals of the at least one encoder of the at least one planar unit by the at least one control unit of the at least one planar unit, wherein in combination or alone the effective encoder signal is used for positioning determination of the one mover over the at least one planar unit, It is further proposed that the method comprises:

Determining the change in position and/or positioning of the one mover over the at least one planar unit, in particular by means of the encoder signals changing over time by the at least one control unit of the at least one planar unit, preferably by means of an evaluation of at least one derivative and/or a plurality of derivatives, in particular a time derivative, of the encoder signal of the adjacent and/or surrounding planar unit(s) and/or of the at least one planar unit, in which the latter is/are set in a geometric reference to the logistics surface and/or of the one mover whose change in position and/or positioning is/are detected are detected.

It is also proposed that the method further comprises

Collecting and/or combining the detected and/or evaluated signals of the encoder and/or the sensor array of the encoder into at least one group, in particular by means of at least one algorithm preferably into groups corresponding to a mover, preferably for a plurality of planar units by the higher-level control system.

Preferred embodiments of the method provide that the method further comprises.

Determining at least one position and/or positioning of the mover on the basis of the signals of the encoders combined to form the at least one group and/or of the sensor array of the encoders of the plurality of planar units, preferably with the aid of further data, in particular at least one dimension of the mover and/or at least one further predefined characteristic variable, by the higher-level control system.

It is further proposed that the method further comprises:

Generating at least one travel command and/or at least one partial route for the at least one mover, the generation preferably being based on at least one travel order provided by at least one higher-level control system and/or at least one enterprise resource planning system (ERPS) and/or the generation being performed by at least one or more BLMC(s) and/or at least one control unit.

According to the invention, it is preferred that the method further comprises:

defining at least one control unit of at least one planar unit, which and/or whose at least one encoder is covered at least regionally by the mover, as primary control unit or master, respectively, by the superordinate control system and/or BLMC for each mover to which a travel command and/or travel order is assigned, and preferably organizing the control unit required for the execution of the travel order and disseminating the information relevant for the generation of the travel command and/or partial route by the control unit defined as primary control unit.

Alternatively or additionally, the method may further comprise:

performing by means of a trajectory planner, which the at least one control unit comprises, trajectory planning or travel order planning, in particular for determining the next travel step and/or movement increment of a partial route and/or travel order, and in particular based thereon executing the control of the at least one drive unit via the drive controller; and/or Controlling and/or adjusting the control loops and/or tracking the position and/or positioning change of the mover by using the own encoder signals of a planar unit or the effective encoder signal according to the detected position and/or positioning change, preferably the respective control loops being controlled centrally by the primary control unit or the master, respectively, and/or being controlled individually by the respective control units of the slaves, particularly preferably the position controller being controlled centrally via the primary control unit.

Also, it is proposed that the method further comprises:

defining at least one further control unit of at least one planar unit, preferably at least one control unit surrounding the primary control unit and/or primary planar unit, which is at least partially covered by the mover, as a secondary control unit or slave, in particular by the control unit defined as the primary control unit, and preferably spreading the movement of the mover by the secondary control units in feedback and/or together with the primary control unit.

In either of the foregoing embodiments, it is preferred that the method further comprises:

interrogation, reservation and/or inclusion in the movement of the relevant mover of the planar unit(s) relevant for the move command and/or the partial route by the control unit defined as the primary control unit, in particular via the control units of surrounding and/or adjacent planar unit(s), preferably based on functionality, occupancy by at least one obstacle and/or by at least one other, in particular second, mover, and/or at least one existing reservation and/or blocking, in particular by another, preferably prioritized, move command, and/or Release of planar units and/or control units that are no longer required, preferably adjustment in feedback with the higher-level BLMCs and/or the higher-level control system or independently, in particular based on the result of the reservation and interrogation of the relevant planar units, preferably in order to adjust the movement of the mover at least incrementally and/or to interrogate and/or reserve planar units required in accordance with the adjustment, and/or Provide the previously defined additional information.

It is further proposed that the method further comprises:

defining at least one control unit as a subsequent primary control unit, which is preferably at least partially covered by the relevant mover, preferably automatically, by the control unit defined as the primary control unit, preferably during the execution of the at least one travel command and/or the at least one partial route for a mover, in particular as soon as (i) the surface of the planar unit and/or the at least one encoder of the control unit defined as primary is no longer covered by the mover;

(ii) the relevant mover has travelled a predetermined distance at which it is to be expected that the planar unit of the primary control unit is no longer sufficiently covered, this preferably being the case if the relevant mover has travelled a distance corresponding to the extent of a planar unit in the direction of movement of the relevant mover, and/or (iii) the encoder signal of the primary control unit falls below a second threshold value, and/or (iv) no longer has a valid encoder signal.

In the above embodiment of the method, it is preferred that the method further comprises:

giving up, preferably independently, the function as primary control unit after the subsequent primary control unit has been defined, by the control unit defined as primary, and/or defining the control unit(s) of the reserved and/or queried planar unit(s) as new secondary control unit(s) or planar unit(s) by the control unit defined as subsequent primary control unit, preferably after the area of the reserved planar unit(s) is covered at least in areas by the mover concerned, and/or Adoption of the planar units defined as secondary control units, which are still covered in areas, as secondary control units by the control unit defined as the subsequent primary control unit and/or preferably Release or define as secondary control unit the control unit defined as primary control unit by the control unit defined as subsequent primary control unit.

Alternatively or additionally, the method may include:

selection of the subsequent primary control unit by the control unit defined as primary control unit based on an evaluation of the encoder signals from the planar units involved in the movement, wherein preferably the at least one control unit of a planar unit involved in the movement of the mover, which provides the most suitable valid encoder signal, is defined as the next primary control unit, wherein preferably the most suitable valid encoder signal among the valid encoder signals is selected at least taking into account at least one second criterion such as: Signal stability, signal strength and/or the signal strength and/or signal stability of the encoders of the adjacent and/or surrounding planar units which are or are to be at least partially covered by the mover, respectively and/or are located in the direction of movement, in particular in the direction of movement of the next increment of movement, preferably the first criterion Finally, it is proposed for the method to further comprise:

Assigning a plurality of individual movers to at least one compound, preferably movers of any size, in particular by the higher-level control system, Defining logical associations of a plurality of individual and/or new connected movers, in particular by the higher-level control system, and/or, preferably simultaneously, giving and/or managing travel commands and/or travel orders for several movers and/or connected movers, in particular prioritizing the travel commands and/or travel orders and forwarding them to the primary control units.

It is further proposed that the method comprises:

Carrying out a position and/or positioning detection and/or size detection and/or dimension detection of a mover by the higher-level control system via a calibration process, wherein preferably at least one encoder signal of the planar units at least partially covered by the mover in question is evaluated by the higher-level control system, wherein in particular the encoder signal is compared against one or more first threshold values Alternatively or additionally, the method may comprise:

detecting the dimension and/or the position and/or the positioning of the mover by the superordinate control system by analyzing the change of at least one encoder signal in dependence on at least one corresponding oscillating forward and/or backward and/or sideward movement of the mover, wherein preferably at least one encoder signal of at least one adjacent planar unit, which only provides a corresponding valid encoder signal by the movement steps, is integrated.

Furthermore, the invention provides a computer program product comprising instructions which, when the program is executed, in particular by a logistics surface according to the invention, cause at least one logistics surface to execute the method according to the invention and/or the steps of the method.

Furthermore, the invention provides a control unit for processing at least one encoder signal of a planar unit comprising at least one encoder, wherein the encoder has at least one sensor array for position and/or positioning determination of at least one mover comprising magnets arranged at least in a pole pitch grid; and the one planar unit is arranged in a surface of a plurality of planar units in such a way that the encoders of the planar units form at least one at least regionally uniform grid, wherein the spacing of the encoders of at least two planar units and/or at least two encoders of one planar unit corresponds to a multiple, in particular a natural, real and/or rational multiple, of the pole pair width of the magnets of the at least one mover.

Furthermore, the control unit can process the encoder signals in such a way as to cause a logistics surface, in particular the logistics surface according to the invention, to execute a method and/or at least one step, preferably a plurality of steps, of the method according to the invention.

The present invention is based on the surprising realization that the design of the logistics area according to the invention with the formation of a uniform grid of encoders and/or the design of the process according to the invention makes it possible to expand the logistics area as desired, simply and efficiently by adding further planar units. Thus, the logistics area according to the invention can be arbitrarily enlarged and/or reconstructed in order to adapt it to new capacity and/or space requirements. Thus, the design of the logistics area according to the invention makes it possible for the logistics area or the logistics system to flexibly organize itself and thus act in a decentralized manner. Compared to systems known from the prior art, in which only a power unit—i.e. drives and sensors integrated in the logistics area—and no control and/or communication unit is installed in the logistics area, the invention makes it possible for the control or regulation to be transferred from a central control unit to the logistics area, in particular the planar units. In particular, it becomes possible to have the travel commands necessary for the execution of a travel order determined, organized, checked, adapted and/or transmitted in a decentralized manner. The design of the grid makes it possible to equip the individual planar units or area motors with their own control units, which also makes it possible for the control units to communicate with each other independently and decentrally. This communication makes it possible for travel commands, trajectories, status information, vectors or comparable data to be passed on over logistics areas of any size, i.e. areas with any number of planar units or area motors. Thus, in all control units, due to the design of the grid, the distance between the encoders is known and can be used as a basis for determining the travel path without the need for intervention by or communication with a central higher-level control system. Furthermore, the decentralized communication system set up by the respective control units of the planar units allows the logistics area to be set up in a modular fashion and to be expanded flexibly without spatial restrictions, since the bus load of the communication system between the planar units remains constant in the process. Preferably, such area expansions are automatically detected by the system consisting of the area motors or their control units and encoders, and the added areas can be automatically integrated into the communication and control system. It should be emphasized that the transmission and processing of information in this way is made possible by means of a real-time transmission system, regardless of the size of the corresponding logistics area.

The one or more encoders integrated in the respective planar units form a grid of discrete measuring points for position and/or positioning detection of the one or more movers on the logistics surface according to the invention. This grid for position and/or positioning detection is realized in that the at least one encoder of the plurality of planar units and/or the encoders of one planar unit have a spacing of a multiple of the pole pair widths of the magnets in the pole pitch grid of the at least one mover. This has the advantage over continuously measuring position and/or positioning determination systems that the grid of encoders formed in this way can be modular and decentralized control by the control units of the planar units is made possible. This enables the high flexibility and scalability of the logistics area according to the invention.

The design of a surface consisting of identically designed or modular planar units with encoders and the use of movers that cover at least two planar units results in redundancy in the position and/or positioning detection and in the drive for the respective movers. This redundancy allows a continuous operation of the logistics area despite a failure and/or deactivation during maintenance work of at least one planar unit.

Furthermore, the direct communication of the planar units to their respective neighboring and/or surrounding planar units allows failed planar units to be uniquely identified.

The above embodiments may be used individually or in any combination to provide the apparatus and method according to the invention.

Further aspects and advantages of the invention will become apparent from the following description, in which preferred embodiments are described with the aid of the accompanying drawings.

Figure 3A:
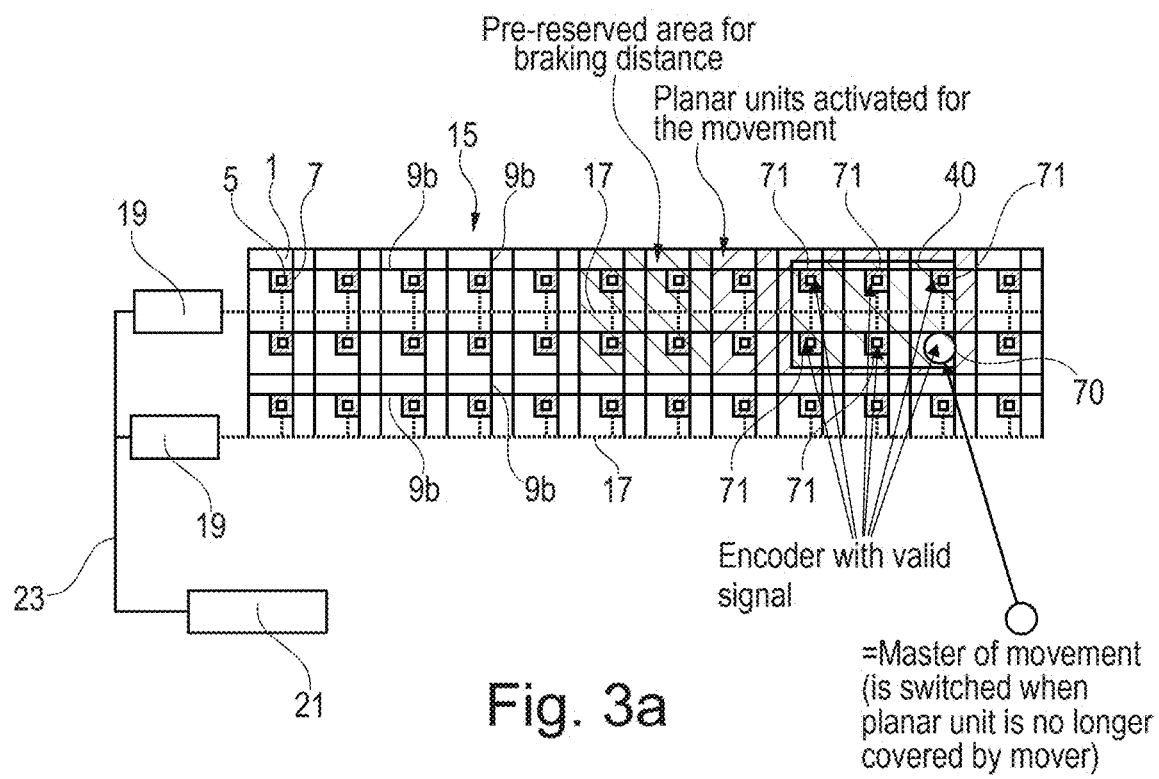
Figure 3B:
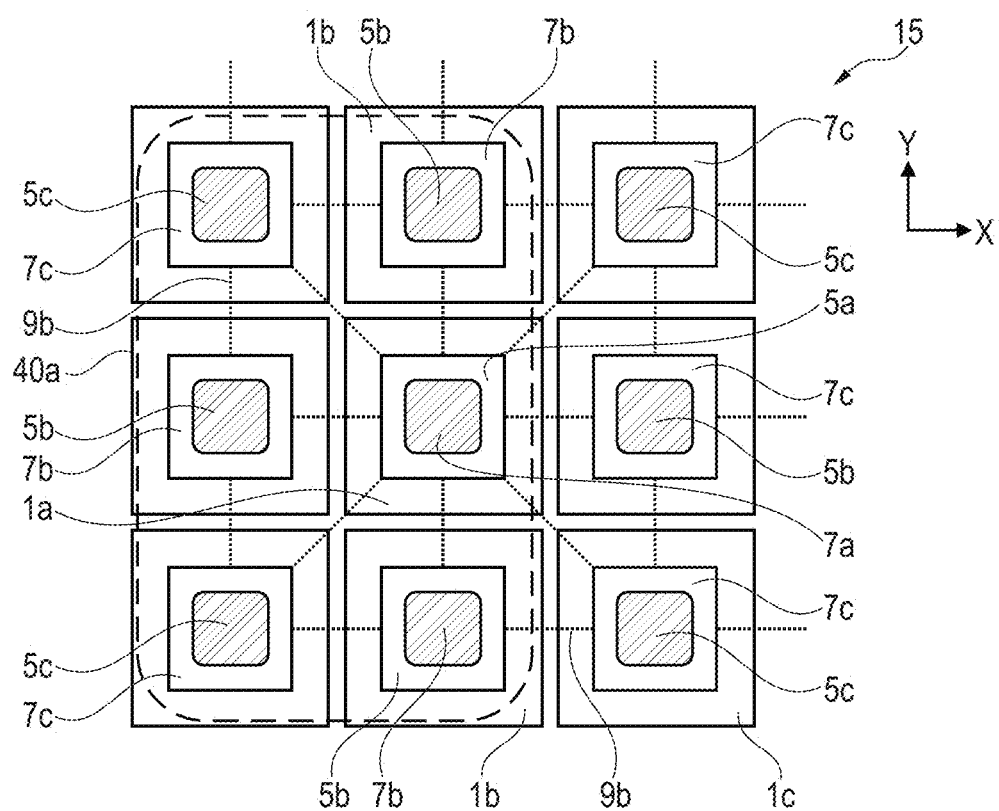
Figure 3C:
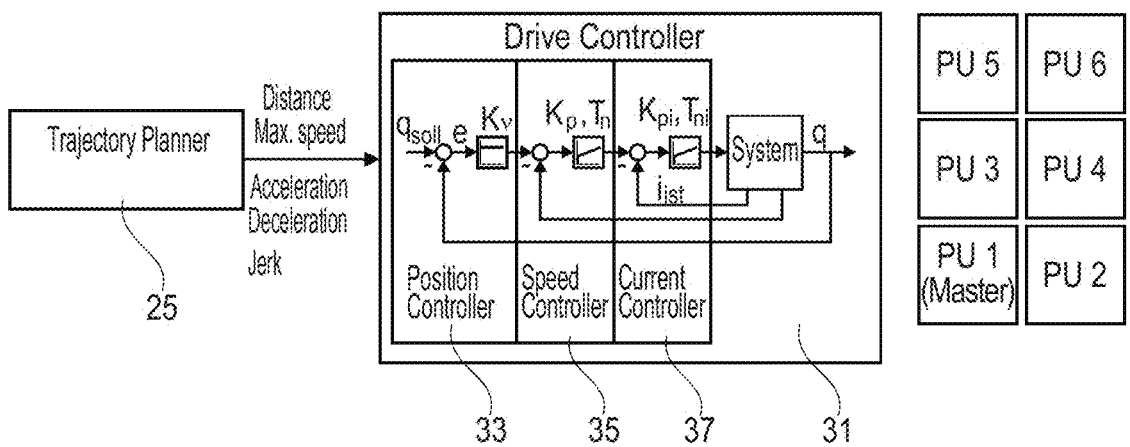

FIG. 3 shows two schematic representations of the logistics area according to the invention. FIG. 3a shows a logistics area according to the invention comprising a plurality of planar units connected to the neighboring and/or surrounding planar units via a third communication interface and, in some areas, to a BLMC via a fourth communication interface, the BLMC in turn being connected to a higher-level control system via a fifth communication interface. In addition, a movement of a mover across the logistics area is shown schematically. FIG. 3b shows a detailed section of FIG. 3a, showing a planar unit as part of a logistics surface with its surrounding and/or neighboring planar units. FIG. 3c shows the drive controllers of a drive unit of the planar unit of FIG. 1.

Figure 4:
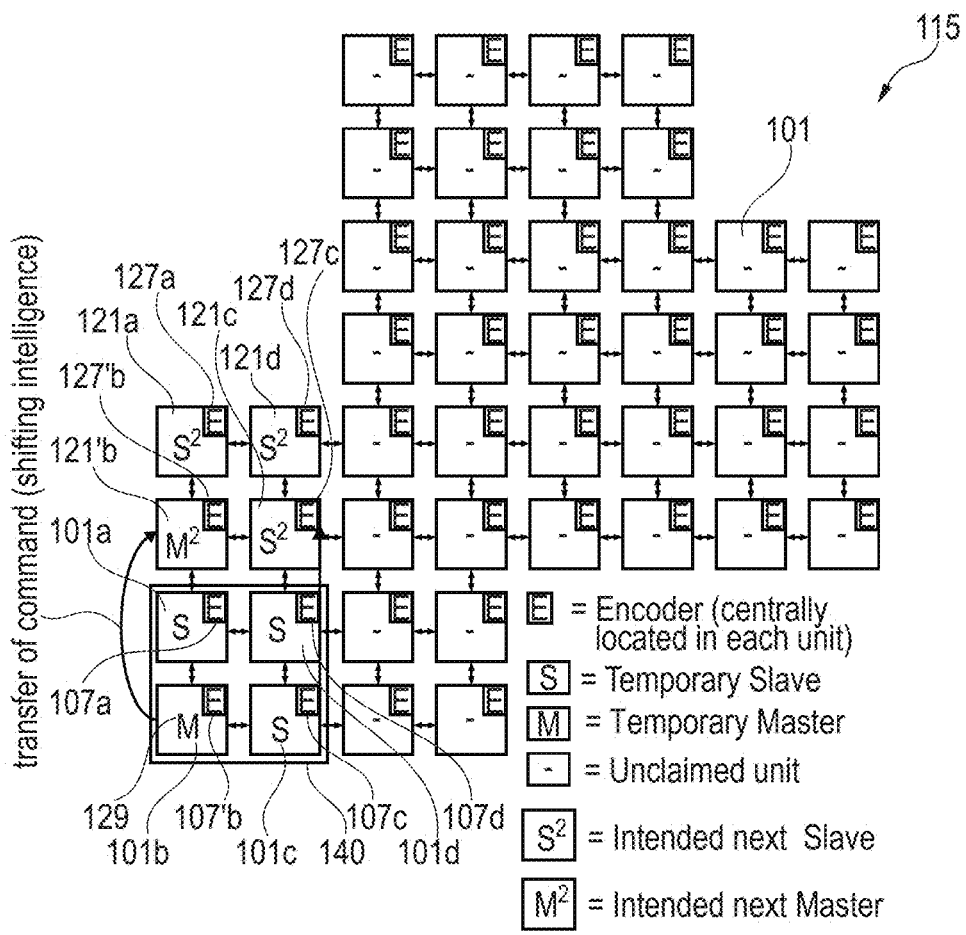

FIG. 4 schematically shows an embodiment of the logistics area according to the invention with mover and assignment of the individual control units of the planar units involved as primary, secondary and reserved control units, respectively, during the execution of a movement of the mover in response to a given travel order and/or travel command.

Figure 5:
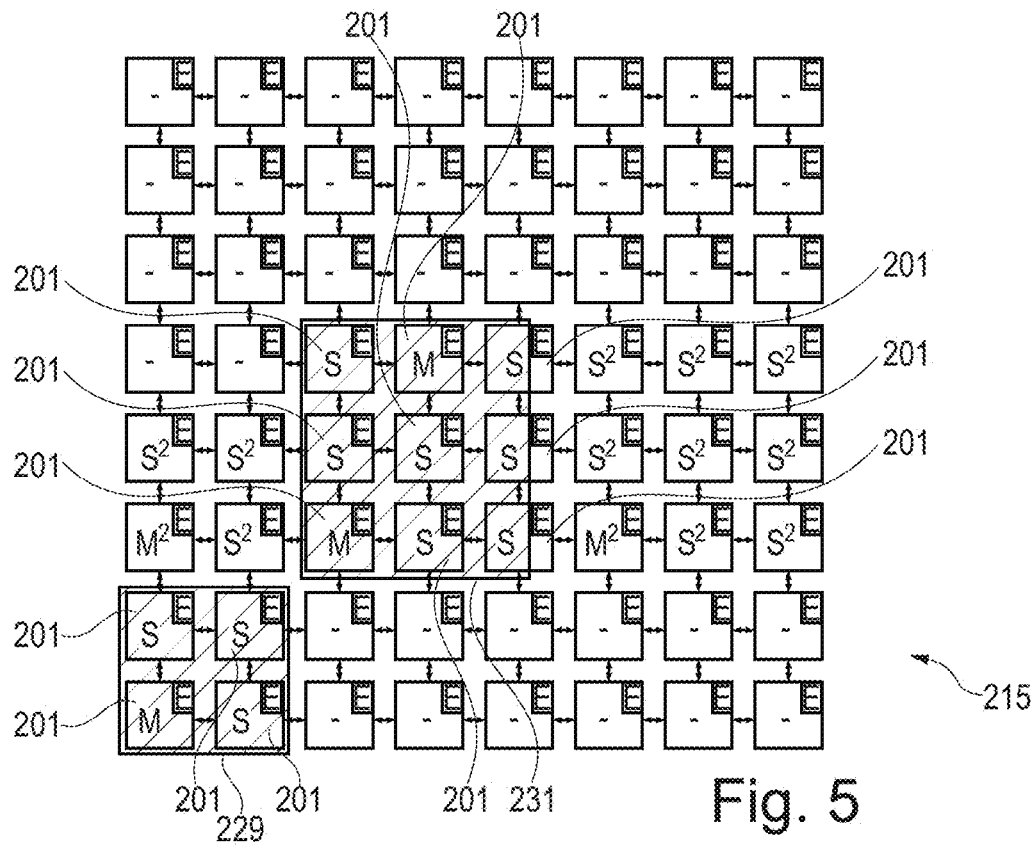

FIG. 5 schematically shows an embodiment of the logistics area according to the invention analogous to FIG. 4, whereby here the movement of two movers is visualized simultaneously.

Figure 6:
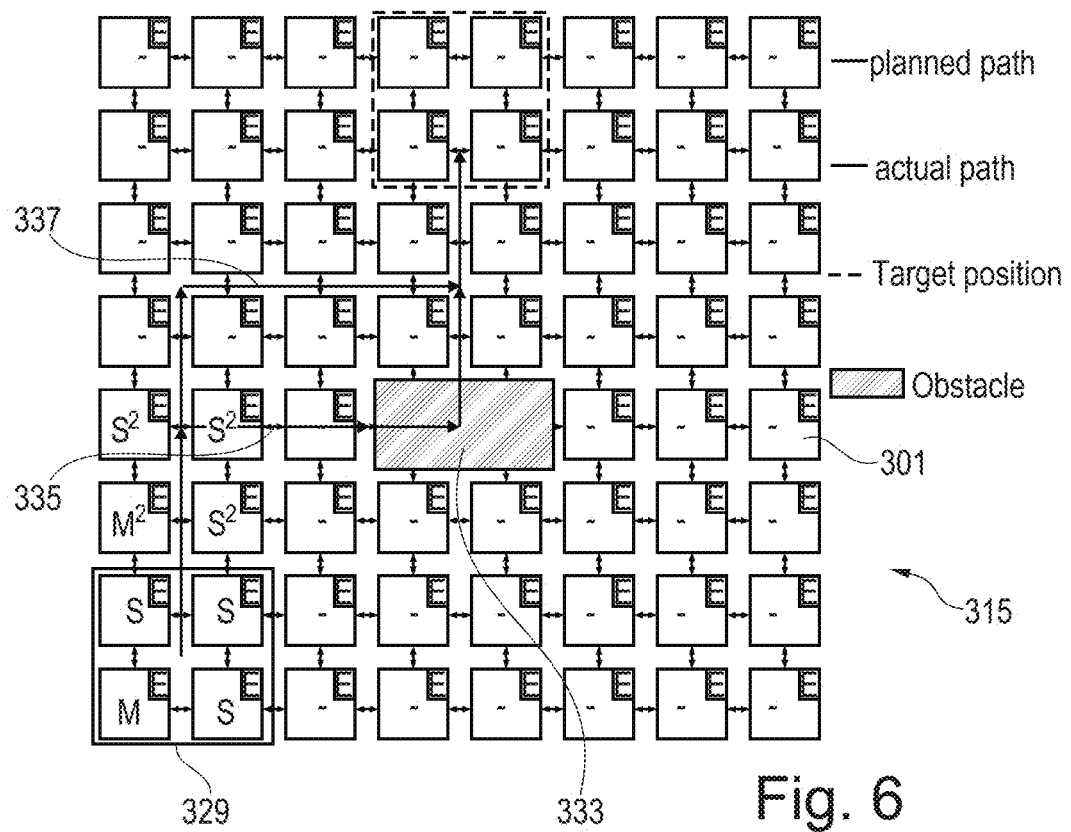

FIG. 6 schematically shows an embodiment of the logistics area according to the invention analogous to FIG. 4, whereby the bypassing of an obstacle by a mover is shown here.

Figure 7:
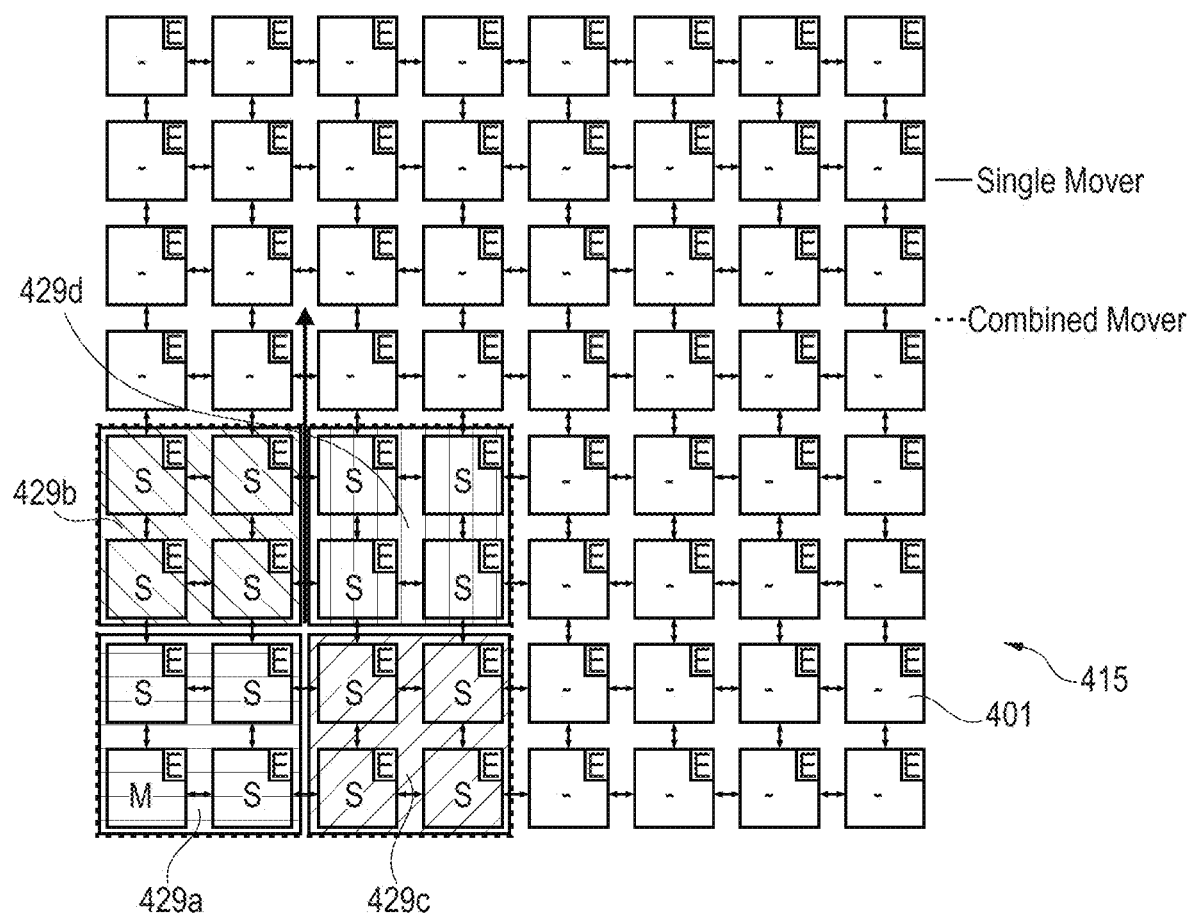

FIG. 7 schematically shows an embodiment of the logistics area according to the invention analogous to FIG. 4, whereby a connected mover is shown here.

DETAILED FIGURE DESCRIPTION

Figure 1A:
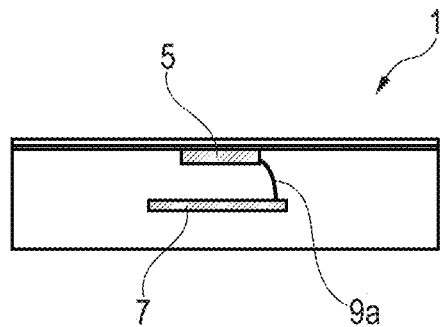
FIG. 1 shows a schematic representation of a planar unit with encoder and control unit in a side view, FIG. 1a, and a top view, FIG. 1b, where encoder and control unit are connected via a first communication interface.
Figure 1B:
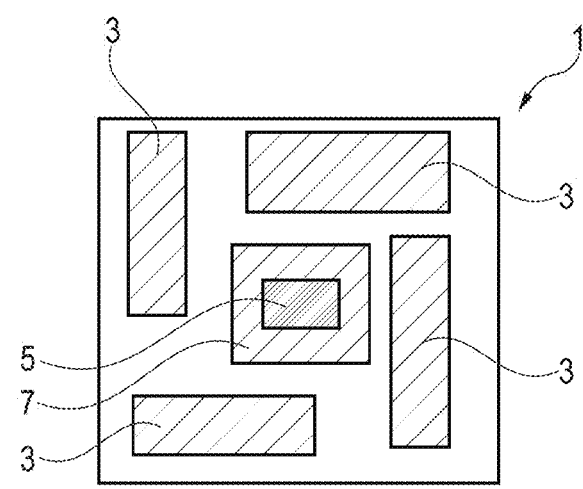

FIG. 1 schematically shows a modular planar unit 1 of a logistics surface not shown in FIG. 1. In addition to at least one drive unit 3, which moves a mover (also not shown in FIG. 1) in at least one direction over the planar unit 1, an encoder 5 and a control unit 7 are also integrated into this planar unit 1. This encoder 5, also called feedback, is used for relative position and/or positioning detection during a movement of the mover. The encoder 5 here comprises at least one array 11 of sensors in the form of Hall sensors 13. The signals from the Hall sensors 13 or from the encoder 5 are transmitted to the control unit 7 via a first communication interface 9a, such as via SPI. The control unit 7 is further connected to the at least one drive unit via an interface representing, in particular, a second communication interface not shown, in order to be able to control the drive unit. Furthermore, the power supply of the at least one drive unit 3 can also be provided via the control unit 7 via this interface, in particular second communication interface.

The control unit 7 has a third communication interface 9b, with the aid of which it can communicate in the logistics area with further, in particular neighboring and/or surrounding, planar units.

The encoder 5 is arranged centrally in the surface of the planar unit 1 over which movers move. However, other arrangements, such as decentralized, e.g. in a corner and/or at a distance from the surface facing the movers, are also possible.

Here, the size of the planar unit 1 is a multiple of the pole pair width of the magnets arranged in a checkerboard fashion in the grid of the pole pitch on the underside of a mover. These magnets move over the Hall array 11 of the encoder 5 at a distance of, for example, 6-10 mm when a mover moves over the planar unit 1.

Figure 2:
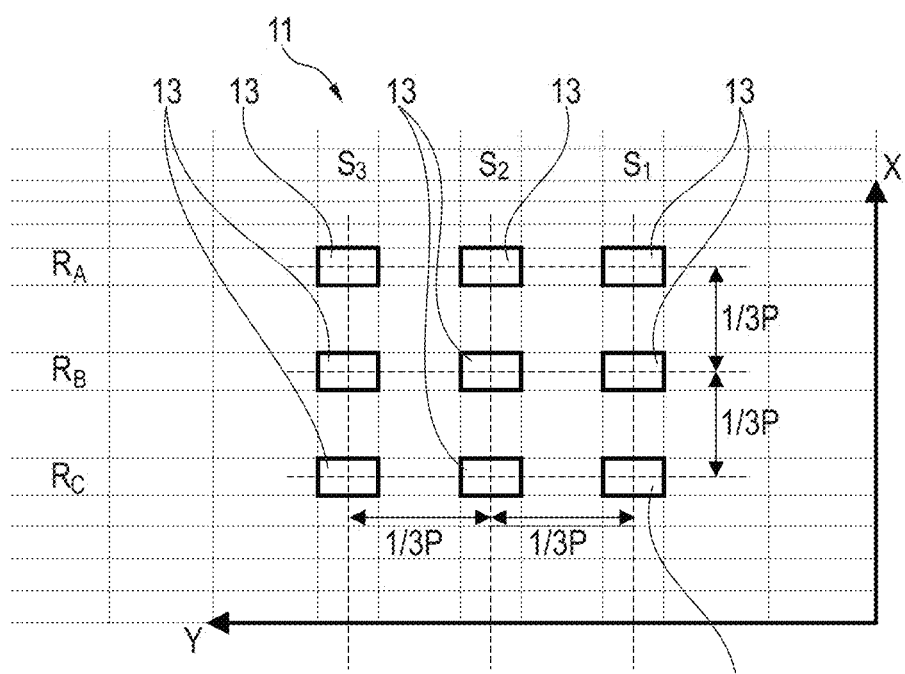
FIG. 2 shows a schematic diagram of the array of sensors in the form of Hall sensors of an encoder.

The structure of an array 11 of Hall sensors 13 of the encoder 5 is shown in FIG. 2. In the embodiment of the encoder 5 of FIG. 2, an array 11 of nine Hall sensors 13 is formed. The distance between the Hall sensors 13 is ⅓ of the pole pair width. Generally, in an alternative embodiment, an array 11 with spacing of 1/n of the pole pair width can be used equivalently with $n^2$ Hall sensors 13.

The magnets of the mover induce a sinusoidal voltage in the individual Hall sensors 13 as the mover moves across the planar unit 1.

When moving along the X-direction, i.e. in a direction up or down in FIG. 2, the individual voltages in column $S_1$ (in FIG. 2: signals at the Hall sensors $(R_A|S_1)$, $(R_B|S_1)$ and $(R_C|S_1)$; generally the sum of the signals in column 1) add up to a constant voltage. The same applies to the columns $S_2$ and $S_3$ or in general to all columns up to n.

On the other hand, when moving along the X-direction, the individual voltages of the series $R_A$ (in FIG. 2: signals at the Hall sensors $(R_A|S_1)$, $(R_B|S_1)$ and $(R_C|S_1)$, generally the sum of the n signals in series A) add up to a sinusoidal voltage. The same applies to the series $R_B$ and $R_C$, or in general to all series up to n. Here the sum sine voltages of the individual series have a phase shift of 120° to each other for three series, in general 360°/n.

When moving along the Y-direction, i.e. in a direction to the right or to the left in FIG. 2, the individual voltages in the row $R_A$ (in FIG. 2: signals at the Hall sensors $(R_A|S_1)$, $(R_B|S_1)$ and $(R_C|S_1)$, generally the sum of the signals in row $R_A$) add up to a constant voltage. The same is true for series B and C, in general for all series up to n.

On the other hand, when moving along the Y-direction, the individual voltages of column $S_1$ (in FIG. 2: signals at the Hall sensors $(R_A|S_1)$, $(R_B|S_1)$ and $(R_C|S_1)$, generally the sum of the n signals in column $S_1$) add up to a sinusoidal voltage. The same is true for columns $S_2$ and $S_3$, in general for all columns up to n. Here, the sum sine voltages of the individual columns to each other have a phase shift of 120° for three columns, generally 360°/n.

A combined movement along the X-direction and Y-direction, such as a diagonal movement, is a superposition of the movements. Accordingly, sinusoidal voltages result, both for the row signals and for the column signals.

The frequency of the sinusoidal voltages is proportional to the speed of the mover. The amplitude depends on the distance between the magnets of the mover and the Hall sensors 13.

The sinusoidal voltages are analog-to-digital (A/D) converted either in the encoder 5 or in the control unit 7 of the planar unit 1 and can then be digitally evaluated in the encoder 5 or the control unit 7 of the planar unit 1, resulting in position and/or positioning information in the X and Y directions for the respective planar unit or logistics area.

The signals of the individual sensors are also checked for validity in the evaluation electronics of the encoder 5 or the control unit 7. Thus, when the sensors 13 of the Hall sensor array of the encoder 5 are completely covered, the amplitudes of the sinusoidal output voltages of the Hall sensors 13 are approximately equal during the movement. The evaluation electronics can detect whether the amplitudes are approximately equal by calculating the difference and subsequent adjustment with a first limit value. Based on this, the evaluation electronics can detect a valid encoder signal.

Even at standstill, a complete overlap of the encoder 5 by a mover is detected, since the Hall sensors 13 detect a magnetic flux and the output signals assume a value deviating from a background value. This can be used to detect an overlap by a mover by the evaluation electronics. The difference between the output signals and a background value and subsequent comparison with a second limit value can be used to determine whether there is sufficient deviation. A combination of the two detection options is also possible.

FIG. 3a shows schematically and in detail the structure of a logistics area 15 comprising a plurality of planar units 1 as described with reference to FIGS. 1 and 2.

The control units 7 have a third communication interface 9b, e.g. an FPGA bus, with which they can communicate with all neighboring and/or surrounding planar units 1. A first communication level in the logistics area 15 is formed via this third communication interface. The communication is real-time and/or peer-to-peer. The bus load remains constant regardless of the size of the total area, since the number of participants is limited by the neighborhood relationship of the planar units. For example, as shown in FIG. 3a, a planar unit 1 with a square footprint may be adjacent to a maximum of eight planar units.

FIG. 3b shows a section of the logistics area 15 of FIG. 3a to illustrate in more detail the neighboring relationship of a planar unit 1a to its surrounding planar units 1b, 1c. In each case, the planar unit 1a is connected to its planar units 1b, 1c neighboring it across corners and along edges via the third communication interface 9b, which forms the first communication plane. Alternatively, however, only the planar units 1b adjacent across the edge can be connected to the planar unit 1a via a communication interface 9b. Via the third communication interface 9b, the control units 7 exchange their respective identifiers (IDs) and other or additional information with the neighbors.

Furthermore, the planar units 1 are assigned to areas and accordingly connected to at least one bottom layer motion controller (BLMC) 19 for this area via at least a fourth communication interface 17. The BLMCs 19 shown in FIG. 3a are connected to a higher-level control system 21 via a fifth communication interface, preferably based on CAN or EtherNet. Here, the fourth and fifth communication interfaces form a second communication level of the logistics area.

Due to the fact that each control unit exchanges its IDs with each other as already described above, each control unit 7 knows its neighbors with their ID. This information about the ID and the neighbor relationships are forwarded to the higher-level control system via the BLMC. There, the logistics area 15 can be mapped based on the transmitted IDs and the neighbor relationships. The area is thus self-identifying and a failure of planar units is detected automatically, by comparing the transmitted information with the target state of the area. In this regard, the transmission can be done on a regular basis or by interrogation by the supervisory control system 21 and/or the downstream BMLCs 19. Detected defective areas can be avoided by the supervisory control system during routing of move commands for movers 40, which will be explained below. Furthermore, the defective areas can be marked for maintenance by the higher-level control system. The control units 7 can communicate around defective control units using the third communication interface 9b.

The higher-level control system 21 manages travel and/or transport orders for goods on the movers, which are commissioned by an ERP (Enterprise Resource Planning System) not shown in FIG. 3. The higher-level control system 21 processes the various travel orders and generates various collision-free travel routes from them, which are then broken down into individual linear sub-routes. These are then sent in sequence to the corresponding BLMCs, which in turn send them to the appropriate primary control unit under the mover, defined in particular by the higher-level control system 21. The primary control unit in the planar unit then generates from this the travel command, the trajectory and organizes the required secondary control units, optionally the possible forwarding of the primary control unit, which will be explained below, and everything else via the third communication interface. The completed processing of a partial driving job is then reported back to the higher-level control unit by the last or respective last primary control unit via the BLMC. For position and/or positioning determination of a mover, only valid encoder signals are sent from the control unit 7 of a planar unit 1 via the fourth communication interface 17 to the BLMC 19. The BLMC 19 collects the signals and forwards them via the fifth communication interface 23, to the higher-level control system 21. The fifth communication interface 23 can be based on an EtherNet bus.

The higher-level control system 21 combines the forwarded signals in a suitable form to generate continuous position and/or positioning information of the movers. In the process, the signals are collected, called aggregation, and combined by an algorithm into groups corresponding to a mover. Furthermore, additional predefined parameters or dimensions of the mover and/or its load can be retrieved for position and/or positioning determination, e.g. from a database, or can be included in it and/or make it more precise.

The dimensions of a transport unit or mover and/or its load can be detected by means of at least one further sensor located in the at least one planar unit 1, by means of at least one encoder 5 of the planar units 1 and/or by means of at least one camera, each of which detects the covered area of the mover and/or its load. The detected dimensions can be fed into the database. Characteristic values can be generated from the detected dimensions, for example geometry and number of planar units 1 and/or encoders 5 covered by the mover and/or its load. Furthermore, a comparison within the database operatively connected to the control units or a further database with predefined characteristic values is possible. This means that the exact dimensions of the mover and/or the transport unit are always known.

The mover is also in physical contact with the logistics area 15, which significantly reduces the energy consumption to be expended, since no energy is required for levitation. This means that even large loads of any size can be transported.

As only relevant encoder information, i.e. valid signals, are forwarded and processed, position and/or positioning detection can be operated efficiently and with minimal data transfer, and can thus be extended to areas of any size.

The amount of data depends only on the size of the mover and always remains constant, regardless of the size of the area.

As also shown in FIG. 3*a*, redundant position and/or positioning detection for a mover can be implemented if the mover is at least the size of two planar units 1 or more. This allows the failure of an encoder 5 to be detected and compensated for. The failure of individual encoders 5 does not then lead to a failure of the system.

Another special feature of the system described is the discontinuous position and/or positioning information. Thus, the planar units 1 with their individual encoders form a grid, as shown in FIGS. 3*a* and 3*b*. Thus, during the movement of the mover, new encoders 5 are always covered and others are left. This results mainly in a reduced hardware effort compared to continuously measuring systems, especially for large areas.

In order to achieve the most accurate position and/or positioning detection and/or size detection and/or dimension detection of a mover 40, 40*a*, the mover position and/or positioning can be determined more accurately by a calibration process performed via the higher-level control system.

In this process, the encoder signals of the planar units 1, 1*a*, 1*b*, 1*c* at least partially covered by the relevant mover 40, 40*a* are evaluated by the higher-level control system 21. The signals of the encoders 5, 5*a* are compared against one or more first threshold values. These one or more first threshold values serve in particular as a relative measure (for example, a percentage measure) of the coverage of an encoder of a planar unit by the mover 40, 40*a*. In this regard, the one or more first threshold values may be defined in particular as signal amplitudes or the like and/or a measure of signal stability, preferably signal-to-noise ratio or the like. If only one first threshold value is used, it is preferably to be selected in such a way that this first threshold value corresponds to a signal in the case of complete coverage of an encoder of the planar unit 1, 1*a*, 1*b*, 1*c* and/or of the at least one encoder 5, 5*a*, 5*b*, 5*c* by the mover 40, 40*a*.

Alternatively or additionally, the dimension and/or the position and/or the positioning of the mover can be detected more precisely by analyzing the change of encoder signals in dependence of corresponding oscillating forward and/or backward and/or sideward movements of the mover. Preferably, the encoder signals of neighboring planar units 1, 1*a*, 1*b*, 1*c* can likewise be incorporated, which only provide a corresponding valid encoder signal as a result of the movement steps. The higher-level control system thereby initiates the oscillating movements via a primary control unit 21 and evaluates the received signals in order to determine the dimension and/or exact positioning of the mover 40, 40*a*.

Thus, it is particularly advantageous if the movement of the mover in one direction takes place under a constant speed until an encoder of a neighboring and/or surrounding planar unit, which previously did not provide a valid encoder signal, provides a signal with maximum amplitude corresponding to a complete overlap of the encoder 5 and/or the planar unit. Furthermore, the absolute position and/or positioning of the mover 40, 40*a* is monitored at any time by the higher-level control system 21, so that an exact calibration with respect to the dimension of the mover has been performed only once after its configuration from possibly several movers and/or mover elements.

A travel order (move or transport goods X from A to B) is transferred from an order system or ERP system to the higher-level control system 21 (FL Control=Fluid Logistics Control System). In the higher-level control system, routing is used to create collision-free routes for the mover(s) concerned on the logistics area. These routes are then broken down into linear sub-routes. These partial routes are sent one after the other via the associated BLMC to the relevant control unit under the mover. The higher-level control system thus defines a control unit 7 of a planar unit 1, which is covered by the relevant mover 40, as the primary control unit (master) 70 for the relevant mover 40. The BLMC 19, in whose area the primary control unit 70 is located, sends the partial route to it.

In this case, the master or the primary control unit can be selected in particular according to the quality of the encoder signal. For this purpose, all encoder signals of the planar units 1 at least partially covered by the mover 40, 40*a* are transmitted to the higher-level control system 21. The higher-level control system 21 selects between the valid encoder signals taking into account at least one of the following criteria: Signal stability, signal strength, in particular a signal strength that indicates complete coverage of the planar unit by the mover (for example by exceeding the corresponding first or second limit value) and/or the signal strength and/or signal stability of the encoders of the neighboring and/or surrounding planar units that are also at least partially covered by the mover.

The defined primary control unit 70 calculates the travel command, the trajectory and independently defines its secondary control units (slaves) 71 for the area of planar units 1 occupied by the mover 40 and takes over the organization of the control units 7 required for the travel command and the dissemination of the information relevant to the travel command. As described above, the control units 7 communicate with all their neighbors by means of a real-time communication system via the third communication interface 9*b*, which constitutes a first communication level. Through this system, the structure is insensitive to the failure of individual control units 7 and/or encoders 5 in communication and/or other components of a relevant planar unit relevant to position and/or positioning sensing and/or mover movement, and can flexibly respond to and work around interference. The information is forwarded and processed unaffected by disturbances and an optimal travel path can be driven.

Furthermore, this direct communication, which will be described in more detail below with reference to FIG. 3*b*, enables a particularly fail-safe and redundant feedback system for position and/or positioning change detection as well as for position and/or positioning detection of a mover 40, 40*a*, in particular during execution of a move command. For illustration purposes, only the first communication level is shown in FIG. 3*b* for these reasons.

In order to enable said position and/or positioning detection, which is as trouble-free, reliable and continuous as possible, signals of the encoders 5*b*, 5*c* of at least a part of the respective adjacent and/or surrounding planar units 1*b*, 1*c* are transmitted via the first communication level with the third communication interfaces 9*b* to the control unit 7*a* of a planar unit 1*a*, which is involved in the execution of a move command for the mover 40*a*.

Thus, not only its own encoder signal is available to a planar unit 1a, but also the encoder signals of a part or all of the neighboring and/or surrounding planar units 1b, 1c, in order to determine the positioning and/or positioning change of a mover 40a, which at least partially covers the one planar unit 1, 1a. Accordingly, signals from the encoders 5b, 5c of the surrounding and/or adjacent planar units 1b, 1c can be taken into account by the control unit 7a of the planar unit 1a in the position and/or positioning detection of the mover.

Preferably, encoder 7b signals are transmitted from adjacent and/or surrounding planar units 1b that share a common edge with planar unit 1, 1a. In such a case, a planar unit 1a then has an associated encoder signal available for each direction (+/−X and +/−Y) on the grid of the logistics surface. Furthermore, encoder signals of the planar units 1c adjacent and/or surrounding each other via the corners can of course also be made available to the control unit 7a of the planar unit 1, 1a.

In this context, in particular encoder signals, preprocessed encoder signals, in particular the time derivative of encoder signals, and/or data associated with the encoder signals, in particular a measure of signal stability or the like, preferably a signal-to-noise ratio, of the neighboring and/or surrounding planar units 1b, 1c can be evaluated together or separately in the control unit 7a of a planar unit 1, 1a for positioning and/or position detection or for position and/or positioning change detection, in particular during a movement of the mover.

In this context, in addition to the encoder signals received from the surrounding and/or neighboring planar units 1b, 11c, the information relevant to the execution of a move command of a mover 40, 40a and involving the one planar unit 1a must also be taken into account in order to achieve a correct interpretation of the received encoder signals by the control unit 7a of the one planar unit 1a. To this end, the control units of the neighboring and/or surrounding planar units 1b, 1c may communicate whether they are involved in the move command for the same mover 40a as the one planar unit 1a. Furthermore, the control unit 7a of the one planar unit 1a can obtain the information about whether and which of its neighboring and/or surrounding planar units are involved in the movement of the mover 40a from the primary control unit, or if the concerned planar unit 1a should itself be the primary control unit, from the move command information provided by the higher-level control system 21 or BMLC 19.

Alternatively or additionally, the control units 7b, 7c of the neighboring and/or surrounding planar units 1b, 1c communicate, in addition to their encoder signals and ID, their current status in terms of their involvement in move commands for other movers, occupancy by other movers, obstacles and/or other objects on the logistics area, and/or error messages.

Furthermore, the control units 7b, 7c of the neighboring and/or surrounding planar units 1b, 1c can communicate future reservations for other move commands.

In order to achieve a particularly efficient and data-saving communication, the neighborhood relationship of the planar units for information exchange can alternatively or additionally be limited. This can be done or come about, for example, by an external command from the BMLC 19 and/or the higher-level control system 21 and/or a higher-level grouping of planar units. For example, planar units 1a that are in a neighbor relationship only via edges 1b or corners 1c may exchange information. Furthermore, the neighbor relationship can also be limited via a superordinate subdivision of the logistics area into certain areas by the superordinate control system 21 or the BLMC 19.

As a result of the information exchange, only those encoder signals from neighboring and/or surrounding planar units 1b, 1c are considered relevant by the control unit 7a of the one planar unit 1a that are involved in the movement and/or the execution of a move command via a primary control unit 70. This ensures that only relevant encoder signals from encoders of the adjacent and/or surrounding planar units 1b, 1 c that provide relevant information for position determination are considered. Thus, no encoder signals from surrounding and/or neighboring planar units that are occupied by another mover and/or are included in and/or reserved for another move command are taken into account for the position and/or positioning detection and/or position and/or positioning change detection described below.

Thus, subsequently, from the relevant encoder signals, by means of an algorithm and/or based on at least one first criterion such as signal stability, signal strength and/or the signal strength and/or signal stability of the encoders of the neighboring and/or surrounding planar units which are or are to be at least partially covered by the mover 40, 40a, and/or are in the direction of movement of the next movement increment, at least one encoder signal can be selected from the group of the encoder signals of the neighboring and/or surrounding planar units 1b, 1c and/or lie in the direction of movement, in particular in the direction of movement of the next movement increment, at least one encoder signal is selected from the group of the encoder signals of the neighboring and/or surrounding planar units 1b, 1c and/or the encoder signals of the planar unit 1a of the control unit 7a. This selection takes place in real time on the respective control unit, in the example of FIG. 3b, control unit 7a.

In a first step, it is first checked whether one of the encoder signals detected by the corresponding planar unit 1a of the control units 7 from its own encoder 5a is valid, i.e. exceeds the first or second limit value and/or one of the one or more first threshold values. The first threshold values thereby define in particular signal amplitudes or the like and/or a measure of a signal stability, preferably the signal-to-noise ratio or the like, corresponding to a partial overlap of the encoder by a mover 40a.

For example, a control unit may store control units 7a of planar unit 1a, for one of the one or more encoders 5a, first threshold values corresponding to an overlap of an encoder and/or the one or more planar units by a mover 40, 40a from 5%, to 100% in 5% steps, or 10% steps, or 20% steps, or 25% steps, or 50% steps, or any combination of different step sizes.

Furthermore, in a second step, if none of the at least one encoder signals of the at least one encoder 5a comprised by the planar unit 1, 1a is valid, at least one relevant signal of the encoders 5b, 5c of the neighboring and/or surrounding planar units 1b, 1c is used. Preferably, the encoder signal of the neighboring and/or surrounding planar unit 1b, 1c, which has the highest signal quality and/or strength/amplitude, is assumed instead of the non-valid signal of the encoder 5a of the planar unit 1a. This allows in particular a fail-safe positioning detection and/or continuation of a travel route of the respective mover.

Furthermore, it is possible to alternatively or additionally give more weight to or exclusively consider encoder signals that are within an already driven and/or notified trajectory, driving route and/or movement and/or one or more driving steps and/or partial routes.

In a preferred embodiment, this evaluation for determining the position and/or positioning of a mover 40*a* is supported, in particular by machine learning and/or artificial intelligence. Thereby, based on data sets of encoder signals of already recorded and completed mover movements, driving routes, partial routes, driving steps and or total and or partial trajectories, models are created and trained. These models are used on the respective control units 7, 7*a* of the planar unit 1, 1*a* and/or by the supervisory control system 21 for position and/or positioning determination and/or detection of one or more position and/or positioning changes of the mover 40, 40*a*. Preferably, the models are created based on one or more of the following methods: Principal Component Regression and/or Analysis (PCR, PCA), Partial Least Square Regression (PLSR), Neural Networks and/or Supported Vector Machines (SVM).

The advantage of a machine learning based and/or artificial intelligence based and/or supported encoder signal evaluation is the increased robustness of the evaluation and the better as well as more efficient assignment of patterns and/or patterns in the encoder signals to a mover and/or a mover movement.

Alternatively, an effective encoder signal may be determined from part or all of the adjacent and/or surrounding planar units 1*b*, 1*c*. In addition, the signals of the encoder 5*a* of the planar unit 1*a* can also be taken into account and included in the determination of the position and/or positioning of a mover 40*a*. In this case, the effective encoder signal is determined by the control unit 7*a* of the respective planar unit 1*a*. Thus, in combination or alone, the effective encoder signal can be used to determine the positioning of the mover 40*a* above the planar unit 1*a*

Alternatively or additionally, the effective encoder signal may be determined in combination (for example, by averaging and/or an interpolation and/or pattern recognition) from relevant encoder signals of the neighboring and/or surrounding planar units and/or encoder signals of planar units which, like the planar unit 1*a*, are and/or were involved in a travel step and/or a partial route of the mover 40, 40*a*, wherein in particular planar units which are located in or against the direction of travel of the mover 40, 40*a* are weighted more strongly.

By means of this effective encoder signal, the corresponding control of the movement of a mover by the at least one drive unit of the planar unit can then be executed more efficiently.

Furthermore, by means of the encoder signals of the adjacent and/or surrounding planar units 1*b*, 1*c*, not only the current position and/or positioning of the mover above the one planar unit 1*a*, 1 can be detected, but also corresponding position and/or positioning changes.

In an exemplary embodiment, the position and/or positioning change of the mover over a planar unit 1*a* is determined by the encoder signals changing over time. The same signal evaluation methods and/or steps may be used that have already been described for determining the positioning and/or position of the mover. In order to derive a relative position and/or positioning change over a planar unit 1*a*, these signals are further evaluated accordingly over time.

In particular, derivatives of the encoder signals of the neighboring and/or surrounding planar units 1*b*, 1*c* and/or of the one planar unit 1*a*, 1 can be evaluated by placing them in a geometric reference to the logistics surface and/or the mover 40*a* whose position and/or positioning change is being detected.

In a preferred embodiment, this evaluation for determining position and/or positioning changes is supported in particular by machine learning and/or artificial intelligence. In this case, travel routes, partial routes, travel steps and/or total and/or partial trajectory models are created and trained based on data sets of encoder signals from previously recorded and completed mover movements.

As described above, these models can be used on the respective control units 7, 7*a* of a planar unit 1, 1*a* and/or by the higher-level control system 21 for position and/or positioning determination and/or detection of one or more position and/or positioning changes of the mover 40, 40*a*. Preferably, the models are created based on one or more of the following methods: Principal Component Regression and/or Analysis (PCR, PCA), Practical Least Square Regression (PLSR), Neural Networks and/or Supported Vector Machines (SVM).

Alternatively or additionally, the effective encoder signal can also be used to detect and/or track position and/or positioning changes of the mover. In particular, the temporal change of the effective signal is analyzed.

In one embodiment, the planned and/or already traveled position and/or positioning change of the travel and/or movement step to be executed and/or already executed and or the partial route may additionally or alternatively be taken into account for better position and/or positioning change detection.

Further, it is possible to incorporate that effective encoder signal into the machine learning and/or artificial intelligence assisted and/or based position and/or positioning detection as well as the position change and/or positioning change detection.

The above-described integration of the adjacent and/or surrounding planar units 1*b*, 1*c* into the feedback system for position and/or positioning detection, as well as for detection of position and/or positioning change of the mover via a planar unit 1, 1*a*, which in particular is involved in a movement of the mover 40, 40*a*, in particular reduces the error susceptibility of the overall system with respect to encoder failures of individual planar units 1, 1*a*. Also, this provides an effective methodology to compensate for such encoder failures. Moreover, likewise, unwanted shielding of the encoder, for example by overlapping of the same by rollers of a mover 40, 40*a*, can be effectively handled and compensated for. Furthermore, taking into account the encoder signals of the adjacent and/or surrounding planar units 1*b*, 1*c* enables more accurate position or positioning detection and/or detection of position or positioning changes over a planar unit 1, 1*a*.

During the movement, new planar units required for the movement are requested, reserved and activated by the control units and included in the movement. In particular, the drive units of the planar units 1 included in the movement of the mover 40, 40*a* operate synchronously in this process. This enables a uniform movement of the mover that is less susceptible to interference, which is achieved in particular by decentralizing the drive via the drive units of a plurality of planar units. Furthermore, a uniform load distribution over all available planar units involved in the movement is achieved. To control the synchronous movement, preferably the feedback system described before in FIG. 3*b* can be used.

At the same time, planar units that are no longer required are released behind the mover. In this context, the primary control unit can also be passed on during the execution of the travel job as soon as the original primary control unit 70 is no longer covered by the mover concerned by the travel job. Alternatively, or in combination with this, the primary control unit can preferably also be passed on as soon as the mover 40 has covered a predetermined distance. In particular, this may be a distance for which it is to be expected that the planar unit of the primary control unit 70 is no longer sufficiently covered. This is particularly the case if the mover has covered a distance corresponding to the extent of a planar unit in the direction of movement. Alternatively or additionally, the primary control unit 70 may be passed on after the encoder signal has fallen below a second threshold value, for example the signal amplitude or the like and/or a measure of signal stability, preferably the signal-to-noise ratio or the like. In one embodiment, the second threshold value may correspond to one of the one or more first threshold values.

After passing on the function as the primary control unit, the original primary control unit can either be released or continue to be involved in the movement of the mover 40 as a secondary control unit.

This will be discussed further with reference to FIG. 4.

Furthermore, the decentralized control units of the individual planar units can dynamically reserve an area in the direction of movement, depending on the current speed of the mover 40, which comprises several planar units 1 within which the mover 40 would come to a standstill in the event of emergency braking. No movement of another mover can take place in this area, which, regardless of the routing of the higher-level control system 21, provides diverse redundant collision avoidance. At the same time, the drive units 3 are not active in this area, which reduces energy consumption.

In the following, the optional but preferred method is described, which is used to realize the movement of a mover on the control units 7 of the involved planar units synchronously and/or in parallel. The associated drive controller is shown in FIG. 3c. In this context, the at least one control unit 7 and/or the at least one drive unit 7 of a planar unit 1 may comprise a drive controller. Generally, the drive controller 31 comprises at least three individual controller elements: a position and/or positioning controller 33, a speed/speed controller 35, and a current/current controller 37. These controllers 33, 35, 37 each control three control loops of the drive unit 3. Furthermore, each control unit also comprises a motion step planner/trajectory planner 25 that processes the partial route for a mover 40 and controls the drive controller 31 accordingly. In particular, the respective controllers regularly request the data required for control, so the sampling rate for this can be the same or different for each controller. A sampling rate of 1 kHz for the position and/or positioning controller 33, of 5 kHz for the speed/speed controller 35 and of 10 kHz for the current/current controller 37 is particularly preferred. However, other sampling rates are also possible, in particular also at least one identical sampling rate for the controllers 33, 35, 37.

Preferably, the method comprises the following steps:
1. trajectory planning or travel order planning to determine the next travel step and/or movement increment of a partial route;
2. control of the drive units via at least three control loops, for example current controller, speed controller and position controller;
3. using the own encoder signals of a planar unit 1 or the effective encoder signal determined from the in encoder signals of the surrounding and/or adjacent and/or surrounding planar units alone and/or in combination with the own encoder signal to track the position and/or positioning change of the mover 40 and/or to control the control loops according to the detected position and/or positioning change.

Individual control loops can be controlled centrally by the control unit 7 of the master 70 or the primary control unit 70 and/or controlled individually by the respective control units 7 of the slaves 71. In particular, it is convenient to control the position controller centrally via the primary control unit 70 or the master. Thus, in addition to the position and/or positioning change of the mover 40 via its own planar unit, the primary control unit 70 or master also monitors the respective position and/or positioning change via the associated slave 70. This serves to verify that the position and/or positioning change proceeds according to the trajectory planning and that the mover 40 achieves the position change defined according to the trajectory planning via each of the included planar units 1. By using the encoder signals as feedback for controlling the individual control loops, it can be ensured in particular that force losses occurring in places, are compensated locally or directly by the respective control unit 7 by adjusting the control loop parameters and/or manipulated variables, such as current (thrust or tractive force) or rotational speed (velocity). Such (drive) force losses can be due, for example, to uneven ground and/or different ground adhesion and/or a different distance between the mover and the electromagnetic drive units, in particular their magnets. A further schematic representation of the movement of a mover over a logistics surface 115 according to the invention is shown in FIG. 4. Those elements of the logistics surface 115 which correspond to those of the logistics surface 15 bear the same reference signs, but increased by 100. With the aid of FIG. 4, the passing on of the status of a control unit as a primary control unit and the querying and reservation of required planar units 101 are explained below.

Thus, new areas or required planar units 121a, 121'b, 121c, 121d are independently requested and reserved by the control units for the movement of the mover. In the example of FIG. 4, the mover covers the planar units 101a to 101d with control units 107a, 107c, 107d acting as temporary slaves of the temporary master 107b'. After receiving the move command or the information on the move command, in particular from the BLMC 19, the control units communicate in such a way that the planar units 121a, 121'b, 121c, 121d are reserved for a movement of the mover and the control unit 127'b of the planar unit 121'b becomes temporary master, while the control units 127a, 127c and 127d of the planar units 121a, 121c 121d become temporary slaves of the master control unit 127'b. Also, the drive units 3 of the planar units 101a, 101'b, 101c, 101d and 121a, 121'b, 121c, 121d are controlled accordingly for the pending movement of the mover. Thus, in one embodiment, the electromagnetic fields of an electromagnetic drive necessary for the transport or movement of the mover can be established. During this movement of the mover, the function of the primary control unit can be passed on with each iteration and areas or planar units 101 that are no longer required are thus released again for further movement commands. The function of the primary control unit can be passed on either to an adjacent control unit of the primary control unit following the direction of movement of the mover or, as shown in FIG. 4, to a control unit of a planar unit of the planar units reserved for the movement.

Alternatively or in addition to these transfer rules, the selection of the next master or the next primary control unit 71 can also be made by means of evaluation of the encoder signals from the planar units 1 involved in the movement. This evaluation can be performed on the primary control unit 71, which should or must pass on its function as primary control unit in the course of the movement of the mover.

Alternatively or additionally, the assigned BLMC 19 and/or the control system 21 may also perform at least parts of the evaluation and selection of the next primary control unit.

Generally, the control unit 7 of a planar unit 1 involved in the movement of the mover 40 and providing the most suitable valid encoder signal may be selected as the next primary control unit. The most suitable valid encoder signal is determined among the valid encoder signals at least taking into account at least one of the following second criteria: signal stability, signal strength, in particular a signal strength which indicates complete coverage of the planar unit by the mover (for example by exceeding a corresponding first and/or second limit value) and/or the signal strength and or signal stability of the encoders of the neighboring and/or surrounding planar units, which in particular are or are to be likewise at least partially covered by the mover, and/or the direction of movement, in particular the direction of movement of the next movement increment. The transfer of the function preferably takes place as soon as the original primary control unit and/or the at least one encoder is no longer covered by the mover 40, does not have a valid encoder signal and/or has fallen below the second threshold value. As already described above, after the function has been passed on as the primary control unit, the original primary control unit can, for example, either be released or continue to be involved in the movement of the mover 40 as a secondary control unit.

In this way, the function as primary control unit or master control 70 and the continuous communication with the secondary control units or slaves 71 and neighboring and/or surrounding control units is constantly adapted on the basis of the movement of the mover. All data and/or signals, in particular encoder signals, previously acquired for the movement, trajectory and/or travel route are thereby preferably passed on by the respective primary control unit 70 or master to its subsequent primary control unit. This enables the respective primary control unit 70 to verify that the preceding motion steps have been executed correctly. In addition, step losses within the planned trajectory are avoided in this way.

In particular, the respective primary control unit 70 also communicates in real time the total measured distance traveled with the secondary control units (slaves) 71 so that they can synchronously implement the corresponding specified distance and direction of the next movement step.

FIG. 5 shows a further embodiment of a logistics area 215 according to the invention. Those elements of the logistics area 215 which correspond to those of the logistics area 115 bear the same reference signs, but increased by 100. FIG. 5 shows that, based on the structure or design of the logistics area 115 described above, the latter is also capable of controlling several transport units simultaneously and independently of one another. Thus, the cover surface 229 of a first mover and the cover surface 231 of a second mover are shown. The first mover with the covering surface 229 covers 4 planar units 201, while the second mover with the covering surface 231 covers a total of 6 planar units 201 completely and 3 further planar units 201 ⅔ each.

FIG. 6 shows a further logistics area 315 according to the invention. Those elements of the logistics area 315 which correspond to those of the logistics area 215 bear the same reference signs, but increased by 100. The logistics area 315 has an obstacle 333. To move a mover from a position represented by cover surface 329 to the position represented by cover surface 331, a planned travel path 335 cannot be selected due to obstacle 333. Obstacles may include defective areas or areas that are shut down for maintenance. Therefore, by the control units or the higher-level control system, the travel path 337 is reserved and traveled. Furthermore, the logistics areas 15, 115, 215, 315 according to the invention can also take into account the movements of other movers, stationary, non-moving, movers and/or obstacles 333 during the execution of a travel order and/or travel command or a movement of a mover, in particular bypassing these other movers and/or obstacles 333 when planning the travel path. Thus, the travel path is broken down into simple, short and straight sections by means of the higher-level control system (FL Control) and several lower-level cascadable BLMCs and control units of planar units 301 to guarantee collision-free travel. Thus, the control units can independently detect whether the movement can continue or whether a collision with an obstacle 333 or the travel command of another mover is imminent and react according to the predetermined programming. For this purpose, the control units of the planar units are pre-reserved in a decentralized manner in the direction of travel of a first travel command by the control units already integrated. Usually, the control units are pre-reserved for the next path increment, but a more extensive reservation over larger parts or the entire path is also possible via a cascade over the third communication interface or the first communication level formed thereby. If the pre-reserved control units receive an additional different second travel command, such as for a second mover, they return an error message for this additional travel command, so that this movement is stopped before the already reserved area and a collision is avoided. The abort of the movement is reported back to the higher-level control system, which then adjusts the routing. In the case of obstacles, such as defective planar units and/or planar units deactivated or marked for maintenance purposes and/or planar units stationarily occupied by movers, this can also be done for a first move command. Furthermore, it is possible that the control units exchange the position and/or positioning information of the movers and/or obstacles 333 with each other and coordinate the travel paths with each other.

FIG. 7 shows a further logistics area 415. Those elements of the logistics area 415 which correspond to those of the logistics area 315 bear the same reference signs, but increased by 100. Based on FIG. 7, it is shown that a plurality of movers, in this case four movers represented by cover surfaces 429a, 429b, 429c and 429d, can be configured to form a group or virtual overall mover. This enables closed-loop locomotion as an overall mover, in that all planar units under the overall mover are controlled by a master. By appropriate programming such a locomotion is guaranteed or realizable. I.e. several transport units or movers can be brought together and defined as one logical, large transport unit in order to transport loads with a larger contact surface or weight or to group goods on different movers and move them together. Priorities can be set, which means that a priority is assigned to defined movers before the move command is initiated. Other move commands are subordinated to this move command. In this way, the area can be rearranged and reorganized at any time. Arbitrary grouping and rearrangement of transport units in a confined space is possible "on the fly" at any time.

Due to high attraction forces emanating from the permanent magnets attached to the transport units, the transport units remain in position even when switched off. The attraction forces can be so high that, in the switched-on and switched-off state, an arm with weight protruding far beyond the perimeter of the mover does not cause the mover with the arm to tip over. This makes it possible, for example, to operate robots on the mover without it tipping over. These high tightening forces actually also enable overhead operation of the surface, e.g. on a hall ceiling. Even when switched off, the movers cannot fall down, provided that the load is of a suitable weight and secured.

The logistics areas 15, 115, 215, 315, 415 described in FIGS. 1 to 7 are not subject to any spatial restrictions and can be flexibly expanded to meet new needs. In conventional logistics areas known from the prior art that operate in real time, the number of participants is limited due to the limited computing and control resources. Above a certain number of participants, the real-time requirement can no longer be achieved with these.

The features shown or described in the foregoing description, claims and figures may be essential to the invention in its various embodiments, either individually or in any combination.

LIST OF REFERENCE SIGNS

1 Planar unit
1a Planar unit
1b adjacent planar unit (via edge to planar unit 1a)
1c adjacent planar unit (via corner to planar unit 1a)
3 Drive unit
5 Encoder
1a Planar unit encoder 1a
5b adjacent encoder (via edge to planar unit 1a)
5c adjacent encoder (via corner to planar unit 1a)
7 Control unit
7a Planar unit control unit 1a
7b adjacent control unit (via edge to planar unit 1a)
7c adjacent control unit (via corner to planar unit 1a)
9a first communication interface
9b third communication interface
11 Array
13 Hall sensor
15, 115, 215, 315, 415 Logistics area
17 fourth communication interface
19 Control Bottom Layer Motion Controller (BMLC)
21 Control system (FL Control)
23 fifth communication interface
25 Trajectory planner/motion step planner
31 Drive controller
33 Position/position controller
35 Speed/speed controller
37 Current/current controller
40 Mover
40a Mover
70 primary control unit/master
71 secondary control unit/salvo
101, 101a, 101'b, 101c, 101d Planar unit
107a, 107'b, 107c, 107d Control unit
121a, 121'b, 121c, 121d Planar unit
127a, 127'b, 127c, 127d Control unit
129, 229, 329, 429a to 429d Cover area
201, 301, 401 Planar unit
331 Cover surface second mover
333 Obstacle
335 Route
337 Route
Series $R_1$, R, $R_{23}$
Column $S_1$, S, $S_{23}$

The invention claimed is:

1. A logistics surface comprising a plurality of planar units, wherein each planar unit is equipped with at least one encoder, having at least one sensor array, for determining the position and/or positioning of at least one mover, wherein the at least one mover comprises magnets arranged in at least one pole pitch grid; the plurality of planar units is arranged to form a surface such that the encoders of the planar units form at least one grid which is at least partly uniform, and the spacing of the encoders of at least two planar units and/or of at least two encoders of one planar unit corresponds to multiple pole pair widths of the magnets of the at least one mover.

2. The logistics surface according to claim 1, characterized in that a surface comprised by the at least one mover is larger than a surface comprised by a planar unit, preferably the surface is comprised by at least four planar units, the mover rests moveably on the logistics surface and/or is held in position by its weight and/or by the magnetic pull of at least a part of the magnets in the pole pitch grid of the at least one mover, in particular if the at least one mover is not to be actively moved and/or the multiple pole pair widths is a natural number, a real number greater than 1, and/or a rational number.

3. The logistics surface according to claim 1, characterized in that at least one length of the planar unit defining the, preferably square, surface of the planar unit corresponds to an in particular natural, real and/or rational multiple, preferably 24-times or 12-times, of the pole pair width of the magnets of the at least one mover and/or the planar unit has a length of more than 100 mm, preferably more than 200, more preferably more than 400, particularly preferably 480 mm and/or the magnets in the pole pitch grid of the at least one mover are arranged at a pole pair width of more than 4 mm, preferably more than 16.66 mm, more preferably more than 18.75 mm, particularly preferably 20 mm or 40 mm.

4. The logistics surface according to claim 1, characterized in that the sensors of the sensor array are arranged at a spacing of 1/n of the pole pair width of the magnets, wherein the array in particular comprises $n^2$ sensors, wherein preferably an array with nine sensors which are arranged at a spacing of ⅓ of the pole pair width is implementable, wherein in particular the sensors comprise Hall sensors, fluxgate compasses and/or magnetometers, and/or wherein n is a natural number, a real number greater than 1, and/or a rational number.

5. The logistics surface according to claim 1, characterized in that the at least one encoder is arranged centrally in the planar unit, preferably centrally on the surface of the planar unit facing toward the at least one mover.

6. The logistics surface according to claim 1, characterized in that the planar unit comprises at least one control unit which is preferably operatively connected to the at least one encoder of the planar unit, in particular via at least one first communication interface, and/or is configured to read and/or evaluate signals, preferably at least one signal amplitude, of the at least one encoder or of the sensor array of the at least one encoder, preferably in order to detect if the planar unit is at least partly covered by a mover, wherein in particular the communication with the at least one encoder is carried out via SPI (serial Peripheral Interface) communication.

7. The logistics surface according to claim 6, characterized in that the at least one control unit and the at least one drive unit of the planar unit is embodied as a component, preferably as an integrated component, in particular as a two-axis servo motor or stepper motor control system.

8. The logistics surface according to claim 6, characterized in that the at least one control unit of at least one planar unit communicates with one or more other control units of other planar units of the logistics surface, in particular in real time, via at least one third communication interface, preferably a proprietary bus, particularly preferably an FPGA-based bus, CAN bus, EtherCAT or another Ethernet-based bus, and/or, preferably via at least one fourth communication interface, is operatively connected to, in particular affiliated to, at least one bottom layer motion controller, BLMC, wherein preferably each BLMC is associated with an interconnected region of planar units of the logistics surface, in particular the associated planar units are each operatively connected to, in particular affiliated to, the corresponding BLMC via the fourth communication interface, and/or the BLMCs and control units are cascadingly organized and/or, at least indirectly, connected.

9. The logistics surface according to claim 6, characterized in that the at least one control unit of a planar unit is configured to forward to the at least one BLMC the read-out or evaluated signals of the encoder or of the sensor array of the encoder, preferably in real time and/or by means of the fourth communication interface, wherein said BLMC preferably forwards these signals for each affiliated planar unit, in particularly collectively and/or by means of the fifth communication interface to the superior control system and/or forwards them directly to the superior control system.

10. The logistics surface according to claim 8, characterized in that the at least one control unit of at least one planar unit is, preferably directly, operatively connected to, in particular connected to and/or in communication with, at least one control unit of at least one of the corresponding surrounding and/or adjacent planar units via the third communication interface.

11. The logistics surface according to claim 10, characterized in that the communication and/or connection of the at least one control unit of the at least one planar unit with the adjacent and/or surrounding control units of the planar unit(s) is/are delimited, in particular by at least one external command of the at least one BLMC and/or the at least one control system and/or a superior grouping of planar units and/or a subdivision of the logistics surface, wherein preferably planar units which are only adjacent to each other at at least one corresponding edge communicate via the third communication interface.

12. The logistics surface according to claim 8, characterized in that the at least one BLMC is operatively connected to at least one superior control system, preferably via at least one fifth communication interface, wherein preferably by means of the control system, the BLMC and/or the control unit, one or more partial routes, driving orders and/or driving commands for the at least one or more movers are generatable and/or transferable to the relevant BLMC(s), wherein preferably the one or more driving orders is/are provisible to the superior control system by an enterprise resource planning system (ERPS).

13. The logistics surface according to claim 12, characterized in that for at least one and/or each mover with which a driving command and/or a driving order is associated, the superior control system is configured to define as the primary control unit or master the control unit of a planar unit which and/or at least one encoder of which is covered at least partly by the mover, wherein preferably the organization of the driving commands and/or partial route necessary for carrying out the driving order, in particular the information relevant to the driving command and/or the partial route, is carried out by the control unit defined as the primary control unit and/or the relay of the driving commands necessary for carrying out the driving order or partial route and/or for the information necessary for the driving command and/or the partial route to at least one control unit of at least one further planar unit is carried out, preferably via the third and/or fourth communication interface.

14. The logistics surface according to claim 13, characterized in that the control unit determined as the primary control unit is configured such that further control units of surrounding planar units which are at least partly covered by the mover are each definable as secondary control units or slaves, wherein preferably the secondary control units provide the movement of the mover in feedback and/or together with the primary control unit.

15. The logistics surface according to claim 13, characterized in that the control unit defined as the primary control unit is configured to, via the control units surrounding and/or adjacent to planar unit(s) which is/are relevant for the driving order and/or driving command, request, reserve, and/or incorporate into the provision of the movement of the relevant mover these planar unit(s), in particular in regard to functionality, occupation by at least one obstacle and/or by at least one other, in particular second, mover, an/or in regard to at least one existing reservation and/or blockage, in particular by another, preferably prioritized, driving order and/or driving command, and/or to release no longer needed planar units and/or, preferably in feedback with the superior BLMCs and/or the superior control system or autonomously, in particular based on the result of the reservation and request of the relevant planar units, to adapt the movement of the mover and/or at least one driving command at least incrementally and/or request and/or reserve the necessary planar units in correspondence with the adaptation.

16. The logistics surface according to claim 13, characterized in that the control unit defined as the primary control unit is configured to, during the carrying out of at least one driving order and/or driving command for a mover, preferably automatically, define a control unit as a subsequent primary control unit which is preferably at least partly covered by the relevant mover, in particular as soon as
  (i) the surface of the planar unit and/or the at least one encoder of the control unit defined as the primary control unit is no longer covered by the mover and/or
  (ii) the relevant mover has traversed a predetermined distance after which it is to be expected that the planar unit of the primary control unit is no longer sufficiently covered, wherein this is particularly the case if the relevant mover has traversed a distance which corresponds to the dimensions of a planar unit in the movement direction of the mover and/or
  (iii) the encoder signal of the primary control unit falls short of a second threshold value, and/or
  (iv) there is no remaining valid encoder signal, wherein preferably the control unit defined as the primary is configured to, preferably autonomously, after the definition of the subsequent primary control unit, relinquish its function as the primary control unit and/or preferably the control unit defined as the subsequent primary control unit is configured to define the control unit(s) of the reserved and/or requested planar unit(s) as new secondary control units or planar unit(s), preferably
  (a) after the surface of the reserved planar unit(s) is covered at least partly by the relevant mover, and/or
  (b) to take on as secondary control units the at least partly covered planar units and defined as secondary control units and/or preferably
  the control unit defined as the subsequent primary control unit is configured to release the control unit defined as the primary control unit or to define it as a secondary control unit.

17. The logistics surface according to claim 16, characterized in that the second threshold value of the encoder signal is a signal amplitude or the like and/or a measure for signal stability, preferably the signal-to-noise ratio or the like, and/or corresponds to one of the one or more threshold values.

18. The logistics surface according to claim 16, characterized in that the control unit defined as the primary control unit is configured to select the subsequent primary control unit based on an evaluation of the encoder signals of the planar units incorporated into the movement, wherein preferably the control unit of a planar unit which is involved in the movement of the mover which delivers the most suitable valid encoder signal, is defined as the next primary control unit, wherein preferably the most suitable valid encoder signal among the valid encoder signals is determined at least in consideration of at least one second criterion such as: signal stability, signal strength and/or the signal strength and/or signal stability of the encoders of the adjacent and/or surrounding planar units which are or are to be at least partially covered by the mover and/or located in movement direction, in particular in the movement direction of the next movement increment, preferably the first criterion.

19. The logistics surface according to claim 13, characterized in that the superior control system is configured to carry out a detection of position and/or positioning and/or a size detection and/or a dimension detection of a mover by at least one calibration process, wherein preferably at least one encoder signal of the planar units at least partially covered by the relevant mover is evaluated by the superior control system, wherein in particular the encoder signal is compared to the one or more first threshold values.

20. The logistics surface according to claim 13, characterized in that the superior control system is configured to detect the dimensions and/or the position and/or positioning of the mover by analyzing the change of at least one encoder signal depending on at least one corresponding oscillating forward or backward and/or lateral movement of the mover, wherein preferably at least one encoder signal of at least one adjacent planar unit which only delivers a corresponding encoder signal through the movement steps is incorporated.

21. The logistics surface according to claim 12, characterized in that the superior control system is configured to collect the read-out or evaluated signals of the encoder or of the sensor array of the encoder for a plurality of planar units and/or to combine them into groups, preferably into groups corresponding to a mover, by means of at least one algorithm.

22. The logistics surface according to claim 21, characterized in that the superior control system is configured to carry out a position and/or positioning determination of the mover, preferably using further data, in particular dimensions of the mover or other predetermined parameters, according to the signals of the encoder and/or of the sensor array of the encoder of the plurality of planar units combined into groups.

23. The logistics surface according to claim 12, characterized in that the superior control system is configured to assign individual movers to a grouping, preferably to define movers of any size and/or logical groupings of a plurality of individual and/or new grouped movers and/or to simultaneously issue and/or manage driving orders for several movers and/or connected movers, in particular to carry out a prioritization of the driving orders and to forward it to the BLMC and/or the primary control units.

24. The logistics surface according to claim 8, characterized in that at least a part of the control units of at least a part of the corresponding adjacent and/or surrounding planar units at least
(i) convey some of the signals of the encoders, the raw encoder signals of the pre-processed encoder signals, in particular the time derivative of encoder signals, and/or data associated with the encoder signals, in particular a measure of the signal stability or the like, preferably a signal-to-noise ratio, to the at least one control unit of the at least one planar unit, wherein preferably the signals of the encoders of adjacent and/or surrounding planar units are conveyed which have a common edge with the at least one planar unit,
(ii) convey additional information which is relevant for the position and/or positioning and/or changing of the position and/or positioning of a mover over the at least one planar unit, in particular during the carrying out of a driving command in which the planar unit is involved, and/or
(iii) the at least one control unit of the at least one planar unit is configured to link the conveyed encoder signals and the additional information in order to assess an association of the received encoder signals through the at least one control unit as relevant or not relevant for the position and/or positioning and/or changing of the position and/or positioning of the one mover.

25. The logistics surface according to claim 24, characterized in that the additional information comprises one or more of the following pieces of information:
(i) whether the respective adjacent and/or surrounding planar unit is incorporated into the driving command for the same mover as the at least one planar unit and/or control unit;
(ii) at least one current status relating to an incorporation of the respective adjacent and/or surrounding planar unit into driving commands for other movers and/or an occupation by other movers, obstacles, and/or other objects on the logistics surface, and/or
(iii) future reservations for other driving commands and/or error messages.

26. The logistics surface according to claim 24, characterized in that the control unit defined as the primary control unit is configured to provide the additional information according to claim 15 to the at least one control unit of the at least one planar unit.

27. The logistics surface according to claim 24, characterized in that the at least one control unit of the at least one planar unit is configured to evaluate the signal of the at least one encoder and/or the encoder signals of the adjacent and/or surrounding planar unit(s) together or separately in order to determine the positioning and/or position and/or to determine the change in position and/or positioning, in particular during a movement of the one mover over the at least one planar unit, wherein the at least one control unit is preferably configured to select at least one encoder signal from the group of the encoder signals of the adjacent and/or surrounding planar units and/or the encoder signals of the at least one planar unit by means of the at least one algorithm and/or based on at least one first criterion such as signal stability, signal strength and/or signal strength and/or signal stability of the encoder of the adjacent and/or surrounding planar units which are or are to be at least partially covered by the mover and/or located in movement direction, in particular in the movement direction of the next movement increment, wherein preferably this selection is limited to the encoder signals determined as relevant for the position and/or positioning and/or change of position and/or positioning of the one mover and/or this selection occurs in particular in real time, preferably on the respective control unit of the at least one planar unit.

28. The logistics surface according to claim 27, characterized in that the at least one control unit of the at least one planar unit is configured to, in at least one first step, to check whether one of the one or more encoder signals, which are detected by the at least one planar unit of the at least one encoder of the planar unit, exceed a first or a second limit and/or one or more first threshold values, wherein preferably the one or the more first threshold values are defined as signal amplitudes or the like and/or a measure of the signal stability, preferably the signal-to-noise ratio or the like; and/or in at least one second step, in particular if none of the at least one encoder signal of the encoder comprised by the planar unit are valid, rely on at least one relevant signal of the encoders of the adjacent and/or surrounding planar units, wherein preferably the relevant encoder signal of the adjacent and/or surrounding planar units which has the greatest signal quality and/or strength/amplitude is accepted instead of the invalid signal of the at least one encoder of the planar unit.

29. The logistics surface according to claim 27, characterized in that the at least one control unit of the at least one planar unit is configured to give more weight to or exclusively consider at least one of the encoder signals within an already driven and/or targeted trajectory, driving route, and/or movement and/or one or more driving steps and/or partial routes.

30. The logistics surface according to claim 27, characterized in that the at least one control unit of the at least one planar unit is configured to determine at least one effective encoder signal from at least a part or from the entirety of the adjacent and/or surrounding planar units.

31. The logistics surface according to claim 30, characterized in that the at least one control unit of the at least one planar unit is configured to determine the effective encoder signal either individually or in combination, preferably by message and/or an interpolation and/or pattern recognition, from the encoder signals of the adjacent and/or surrounding planar units, in particular those planar units which
(i) deliver relevant encoder signals;
(ii) are and/or were incorporated into the current driving step of the one mover, wherein in particular planar units which are located in or against the driving direction of the one mover are given more weight.

32. The logistics surface according to claim 27, characterized in that the at least one control unit of the at least one planar unit is configured to consider the signals of the at least one encoder of the at least one planar unit and/or to allow them to factor in to the determination of the position and/or positioning of the one mover, wherein, in combination or individually, the effective encoder signal is used for the positioning determination of the one mover over the at least one planar unit.

33. The logistics surface according to claim 27, characterized in that the at least one control unit of the at least one planar unit is configured to determine the change of position and/or positioning of the one mover over a planar unit, in particular by the encoder signals which change over time, preferably via an evaluation of at least one derivative and/or a plurality of derivatives, in particular a time derivative, of the encoder signal of the adjacent and/or surrounding planar unit(s) and/or of the at least one planar unit, in that this/these is or are set in geometrical relation to the logistics surface and/or the one mover of which the change in position and/or positioning is detected.

34. The logistics surface according to claim 27, characterized in that the at least one control unit of the at least one planar unit is configured to use the effective encoder signal in order to detect and/or to track changes in position and/or positioning of the one mover, wherein, to this end, preferably
(i) at least one time change and/or derivative of the encoder signal is evaluated and/or
(ii) the at least one planned and/or already carried out changes in position and/or positioning of the driving and/or movement step and/or of the partial route to be carried out or already carried out is considered for the purpose of improved detection of changes in position and/or positioning, and/or
(iii) the effective encoder signal is incorporated into the detection of position and/or positioning and/or detection of changes in position and/or positioning, which are preferably supported by and/or based on machine learning and/or artificial intelligence.

35. The logistics surface according to claim 27, characterized in that the at least one control unit of the at least one planar unit and/or the at least one drive unit of the at least one planar unit comprises and/or comprise at least one drive controller and/or the at least one control unit comprises at least one movement step planner/trajectory planner, which preferably processes the partial route of the one mover and drives the drive controller correspondingly.

36. The logistics surface according to claim 35, characterized in that the drive controller comprises at least two, preferably three individual controller elements, selected from: at least one position or positioning controller, at least one revolution speed/speed controller, and at least one power/current controller, wherein preferably, by means of these controller elements, respective corresponding regulating circuits of the drive unit, in particular for controlling thrust or traction, rotations or speed and/or the position or positioning, are controllable.

37. The logistics surface according to claim 35, characterized in that the at least one control unit of the at least one planar unit is configured to:
(i) carry out, by means of the trajectory planner, the trajectory planning or driving order planning for determining the next driving step and/or movement increment of a partial route;
(ii) in particular based thereon, carry out the controlling of the at least one drive unit via the drive controller; and/or
(iii) use the own encoder signals of a planar unit or of the effective encoder signal in order to track the change in position and/or positioning of the mover and/or to control and/or adapt the regulation circuits correspondingly to the determined change in position and/or positioning, wherein preferably the respective regulation circuits are centrally regulated by the primary control unit or the master and/or are individually regulated by the relative control units of the slaves, wherein, particularly preferably, the position regulator is centrally controlled via the primary control unit.

38. The logistics surface according to claim 1, characterized in that the planar unit comprises at least one, preferably two and/or a plurality of, drive unit(s) which is/are in particular configured to transfer the movement of a partial region of the mover or of the movers covering the planar unit over the planar unit, wherein preferably the movement directions transferred by the drive units run orthogonally to each other and/or the drive unit(s) is/are an electromagnetic drive unit.

39. The logistics surface according to claim 38, characterized in that the at least one drive unit is connected to the at least one control unit via at least one second communication interface, preferably in order to be drivable by the at least one control unit and/or to be provided with energy via the same.

40. A computer program product, comprising commands which, when the program is run, in particular by a logistics surface according to claim 1, cause at least one logistics surface to carry out the method/the steps of the method.

41. A method for operating at least one logistics surface comprising a plurality of planar units with at least one mover or at least a grouping of movers which at least partially cover a planar unit, comprising:
  detecting at least one output signal amplitude of sensors of at least one sensor array of at least one encoder of the planar unit;
  determining at least one first difference between at least two output signal amplitudes; and
  checking if the at least one first difference is within at least one first limit,
or
  detecting at least one magnetic flow or field strength and/or at least one other signal of the sensors of the sensor array of the at least one encoder of the planar unit, which is induced and/or generated by the covering of a sensor by the mover;
  determining at least one second difference between at least one output signal of the at least one sensor of the sensor array resulting from the detected magnetic flow and/or the other signal, on the one hand, and a background value on the other hand; and
  checking if the at least one second difference is within at least one second limit.

42. The method according to claim 41, characterized in that the first limit is at most 20%, preferably at most 10%, particularly preferably at most 7% of one of the detected output signal amplitudes and/or the second limit corresponds to at least 20%, preferably at least 10%, particularly 7% of the background value.

43. The method according to claim 41, characterized in that the method further comprises
  forwarding, preferably in real time, the signals of the encoder or the sensor array detected and/or evaluated by at least one control unit of the planar unit to at least one BLMC and/or preferably collecting the signals for each planar unit affiliated to the BLMC;
  forwarding the signals to at least one superior control system;
  receiving at least some of the signals of the encoder, in particular of the raw encoder signals, of the preprocessed encoder signals, in particular the time derivative of encoder signals, and/or data associated with the encoder signals, in particular a measure of the signal stability or the like, preferably a signal-to-noise ratio, of at least some of the respective adjacent and/or surrounding planar units;
  receiving additional information which is relevant for the position and/or positioning and/or changes in position and/or positioning of a mover or mover grouping over the at least one planar unit, in particular during the carrying out of a driving command in which the planar unit is involved; and/or
  linking the at least some of the received signals of the encoder and the additional information in order to allocate the encoder signals received by the least one control unit as relevant or not relevant for the position and/or positioning and/or changes in the position and/or positioning of the one mover.

44. The method according to claim 43, characterized in that the method further comprises
  evaluating, via the at least one control unit, the signal of the at least one encoder and/or one of the encoder signals received by the adjacent and/or surrounding planar unit(s), together or separately in order to determine the positioning and/or position and/or to determine the change in position and/or positioning, in particular during a movement of the one mover over the at least one planar unit, wherein preferably the evaluation comprises a selection which occurs by means of at least one algorithm and/or based on at least one first criterion such as signal stability, signal strength and/or signal strength and/or signal stability of the encoder of the adjacent and/or surrounding planar units, which are or are to be at least partially covered by the mover and/or located in movement direction, in particular in the movement direction of the next movement increment, at least one encoder signal from the group of the encoder signals of the adjacent and/or surrounding planar units and/or the encoder signals of the at least one planar unit, wherein preferably this selection is limited to the encoder signals determined as relevant for the position and/or positioning and/or change of position and/or positioning of the one mover and/or this selection occurs in particular in real time, preferably on the respective control unit of the at least one planar unit.

45. The method according to claim 44, characterized in that the method further comprises
  checking, in at least a first step, whether one of the one or more encoder signals which are received by the at least one planar unit of the at least one encoder of the planar unit exceeds a first or a second limit and/or one or more first threshold values, wherein preferably the one or more threshold values are defined as signal amplitudes or the like and/or a measure for the signal stability, preferably the signal-to-noise ratio or the like; and/or
  relying on, in at least a second step, in particular if, in particular if none of the at least one encoder signal of the encoder comprised by the planar unit are valid, at least one relevant signal of the encoders of the adjacent and/or surrounding planar units, wherein preferably the relevant encoder signal of the adjacent and/or surrounding planar units, which has the greatest signal quality and/or strength/amplitude, is accepted instead of the invalid signal of the at least one encoder of the planar unit.

46. The method according to claim 44, characterized in that the method further comprises
  giving more weight to or exclusively considering at least one of the encoder signals within an already driven and/or targeted trajectory, driving route, and/or movement and/or one or more driving steps and/or partial routes, by the at least one control unit of the at least one planar unit.

47. The method according to claim 44, characterized in that the method further comprises
  considering and/or determining, by the at least one control unit of the at least one planar unit, the position and/or positioning of the one mover of the or by the signals of the at least one encoder of the at least one planar unit, wherein, in combination or individually, the effective encoder signal is used for the positioning determination of the one mover over the at least one planar unit.

48. The method according to claim 44, characterized in that the method further comprises determining the change of position and/or positioning of the one mover over the at least one planar unit, in particular by the encoder signals which change over time, by the at least one control unit of the at least one planar unit preferably via an evaluation of at least one derivative and/or a plurality of derivatives, in particular a time derivative, of the encoder signal of the adjacent and/or surrounding planar unit(s) and/or of the at least one planar unit, in that this/these is or are set in geometrical relation to the logistics surface and/or the one mover, of which the change in position and/or positioning is detected.

49. The method according to claim 44, characterized in that the method further comprises carrying out, by means of the trajectory planner comprised by the at least one control unit, the trajectory planning or driving order planning for determining the next driving step and/or movement increment of a partial route and/or driving command, and, in particular based thereon, carrying out the controlling of the at least one drive unit via the drive controller; and/or controlling and/or adapting the regulation circuits and/or tracking the change in position and/or positioning of the mover using the own encoder signals of a planar unit or of the effective encoder signal corresponding to the determined change in position and/or positioning, wherein preferably the respective regulation circuits are centrally regulated by the primary control unit or the master and/or are individually regulated by the relative control units of the slaves, wherein, particularly preferably, the position regulator is centrally controlled via the primary control unit.

50. The method according to claim 43, characterized in that the method further comprises determining, by the at least one control unit of the at least one planar unit, at least one effective encoder signal from at least a part or from the entirety of the adjacent and/or surrounding planar units.

51. The method according to claim 43, characterized in that the method further comprises:

generating at least one driving command and/or at least one partial route for the at least one mover, wherein the generating preferably occurs based on at least one driving order provided by at least one superior control system and/or at least one enterprise resource planning system (ERPS) and/or the generating occurs by at least one or more bottom layer motion controllers (BLMC(s)) and/or at least one control unit.

52. The method according to claim 51, characterized in that the method further comprises:

defining, by the superior control system and/or the BLMC, at least one control unit of at least one planar unit, which is at least partly covered and/or at least one encoder of which is at least partly covered by the mover, as the primary control unit or master for each mover associated with a driving command and/or driving order and preferably organizing the control units necessary for the carrying out of the driving command and/or the partial route and distributing the information relevant to the driving command and/or the partial route by the control unit defined as the primary control unit.

53. The method according to claim 52, characterized in that the method further comprises:

defining at least one further control unit of at least one planar unit, preferably of at least one control unit surrounding the primary control unit and/or the primary planar unit which is at least partly covered by the mover, as a secondary control unit or slave, in particular by the control unit defined as the primary control unit, and preferably providing the movement of the mover by the secondary control units in feedback and/or together with the primary control unit.

54. The method according to claim 52, characterized in that the method further comprises:

requesting, reserving and/or incorporating into the provision of the movement of the relevant mover of the planar unit(s) which is/are relevant for the driving command and/or the partial route by the control unit defined as the primary control unit, in particular via the control units surrounding and/or adjacent to planar unit(s), preferably based on functionality, occupation by at least one obstacle and/or by at least one other, in particular second, mover, an/or based on at least one existing reservation and/or blockage, in particular by another, preferably prioritized, driving command, and/or releasing no longer needed planar units and/or control units, preferably adapting, in feedback with the superior BLMCs and/or the superior control system or autonomously, in particular based on the result of the reservation and request of the relevant planar units, preferably to adapt the movement of the mover at least incrementally and/or to request in correspondence to the adaptation and/or to reserve necessary planar units.

55. The method according to claim 52, characterized in that the method further comprises:

defining at least one control unit as a subsequent primary control unit, which is preferably at least partly covered by the relevant mover, preferably automatically, by the control unit defined as the primary control unit, during the carrying out of at least one driving order and/or driving command for a mover, in particular as soon as (i) the surface of the planar unit and/or the at least one encoder of the control unit defined as the primary control unit is no longer covered by the mover;

(ii) the relevant mover has traversed a predetermined distance after which it is to be expected that the planar unit of the primary control unit is no longer sufficiently covered, wherein this is particularly the case if the relevant mover has traversed a distance which corresponds to the dimensions of a planar unit in the movement direction of the mover and/or (iii) the encoder signal of the primary control unit falls short of a second threshold value and/or (iv) no longer has a valid encoder signal.

56. The method according to claim 55, characterized in that the method further comprises:

relinquishing, by the control unit defined as the primary one, preferably autonomously, the function as the primary control unit after the definition of the subsequent primary control unit, and/or defining the control unit(s) of the reserved and/or requested planar unit(s) as new secondary control units or planar unit(s) by the control unit defined as the subsequent primary control unit, preferably after the surface of the reserved planar unit(s) is at least partly covered by the relevant mover, and/or assuming the planar units which are still at least partly covered and are defined as secondary control units as secondary control units by the control unit defined as the subsequent primary control unit, and/or preferably releasing or defining as a secondary control unit the control unit defined as the primary control unit by the control unit defined as the subsequent primary control unit.

57. The method according to claim 55, characterized in that the method further comprises:

selecting the subsequent primary control unit by the control unit defined as the primary control unit based on an evaluation of the encoder signals of the planar units incorporated into the movement, wherein preferably the at least one control unit of a planar unit which is involved in the movement of the mover and which delivers the most suitable encoder signal is defined as the next primary control unit, wherein preferably the most suitable encoder signal out of the valid encoder signals is determined in consideration of at least one second criterion such as signal stability, signal strength and/or the signal strength and/or signal stability of the encoders of the adjacent and/or surrounding planar units which are or are to be at least partially covered by the mover and/or are located in the movement direction, in particular in the movement direction of the next movement increment, preferably the first criterion.

58. The method according to claim 55, characterized in that the method further comprises:

carrying out a determination of position and/or positioning and/or determination of size and/or determination of dimensions of a mover by the superior control system via a calibration process, wherein preferably at least one encoder signal of the planar units at least partially covered by the relevant mover is evaluated by the superior control system, wherein in particular the encoder signal is compared to one or more first threshold values.

59. The method according to claim 55, characterized in that the method further comprises:

detecting the dimensions and/or the position and/or positioning of the mover by the superior control system by analyzing the change of at least one encoder signal depending on at least one corresponding oscillating forward or backward and/or lateral movement of the mover, wherein preferably at least one encoder signal of at least one adjacent planar unit which only delivers a corresponding encoder signal through the movement steps is incorporated.

60. The method according to claim 43, characterized in that the method further comprises:

assigning a plurality of individual movers to at least one grouping, preferably movers of any size, in particular by the superior control system, defining logical groupings of a plurality of individual and/or new grouped movers, in particular by the superior control system, and/or, preferably simultaneously, issuing and/or managing driving commands and/or driving orders for several movers and/or connected movers, in particular prioritizing the driving commands and/or driving orders and forwarding them to the primary control units.

61. The method according to claim 41, characterized in that the method further comprises collecting and/or summarizing the detected and/or evaluated signals of the encoder and/or the sensor array of the encoder into at least one group, in particular by means of at least one algorithm, preferably into groups which correspond to a mover, preferably for a plurality of planar units, by the superior control system.

62. The method according to claim 61, characterized in that the method further comprises determining, by the superior control system, at least one position and/or positioning of the mover, preferably using further data, in particular dimensions of the mover or other predetermined parameters, according to the signals of the encoder and/or of the sensor array of the encoder of the plurality of planar units combined into at least one group.

63. A control unit for processing at least one encoder signal of a planar unit comprising at least one encoder, wherein the encoder has at least one sensor array for determining the position and/or positioning of at least one mover comprising magnets arranged in at least one pole pitch grid; and the planar unit is arranged in a surface of a plurality of planar units such that the encoders of the planar units form at least one grid which is at least partly uniform, wherein the spacing of the encoders of at least two planar units and/or of at least two encoders of one planar unit corresponds to a multiple of, in particular a natural, real and/or rational multiple of, pole pair widths of the magnets of the at least one mover.

64. The control unit according to claim 63, characterized in that the control unit processes the encoder signals in such a way as to cause a logistics surface, in particular by a logistics surface, to carry out a method and/or at least one step, preferably a plurality of steps of the steps of the method.

\* \* \* \* \*